(12) United States Patent
Kajita et al.

(10) Patent No.: US 7,719,647 B2
(45) Date of Patent: May 18, 2010

(54) LIQUID CRYSTAL DISPLAY APPARATUS

(75) Inventors: Daisuke Kajita, Hitachi (JP); Ikuo Hiyama, Hitachinaka (JP); Masahiro Ishii, Chiba (JP)

(73) Assignee: Hitachi Displays, Ltd., Mobarashi (JP)

( * ) Notice: Subject to any disclaimer, the term of this patent is extended or adjusted under 35 U.S.C. 154(b) by 1138 days.

(21) Appl. No.: 11/347,250

(22) Filed: Feb. 6, 2006

(65) Prior Publication Data

US 2006/0176424 A1 Aug. 10, 2006

(30) Foreign Application Priority Data

Feb. 8, 2005 (JP) ............................. 2005-031217

(51) Int. Cl.
*G02F 1/1335* (2006.01)
(52) U.S. Cl. ...................... 349/118; 349/117; 349/102; 349/141
(58) Field of Classification Search ................ None
See application file for complete search history.

(56) References Cited

U.S. PATENT DOCUMENTS

| 5,774,197 A | 6/1998 | Nakamura |
| 2003/0122991 A1 | 7/2003 | Itakura et al. |
| 2006/0098146 A1* | 5/2006 | Yano et al. ................. 349/118 |

FOREIGN PATENT DOCUMENTS

| CN | 1160222 | 9/1997 |
| CN | 1431546 | 7/2003 |
| JP | 63-21907 | 5/1988 |
| JP | 9-80424 | 3/1997 |
| JP | 11-133408 | 5/1999 |
| JP | 11-305217 | 11/1999 |
| JP | 2001-56476 | 2/2001 |
| JP | 2001-350022 | 12/2001 |
| JP | 2005-3733 | 1/2005 |

OTHER PUBLICATIONS

Crystal Optics, Japan Society of Applied Physics Optics Gathering for Friendly Discussion, printed by Morokita Shuppan Co., Ltd. 1st Edition 4th. Issue in 1984, Chapter 5, pp. 102-163.
Optics in Stratified and Anisotropic Media: 4×4-Matrix Formulation, D.W. Berreman, 1972, vol. 62, No. 4, p. 502-510.

* cited by examiner

*Primary Examiner*—Richard H Kim
(74) *Attorney, Agent, or Firm*—Antonelli, Terry, Stout & Kraus, LLP.

(57) ABSTRACT

An IPS-mode liquid-crystal display apparatus for controlling transmission and cutoff of light by applying a cross-directional electric field to liquid-crystal molecules horizontally oriented reduces diagonal luminance rise and coloring at the time of black display by a simple configuration. A configuration is used in which an optical phase compensation member for canceling the double refraction property of a polarization-plate support base material is provided between the liquid-crystal-layer-side support base material of a lower polarizer and a liquid-crystal layer. Or, a configuration is used in which the optical phase compensation for canceling double refraction property of the polarization-plate support base material is provided between the liquid-crystal-layer-side support base material and the liquid-crystal layer.

15 Claims, 36 Drawing Sheets

FIG.3
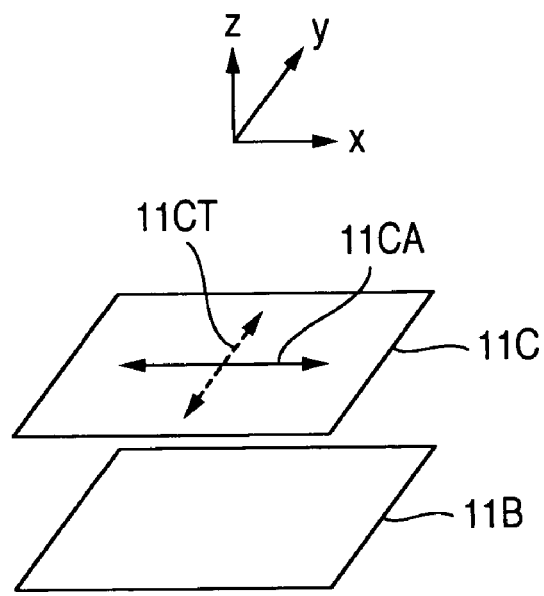
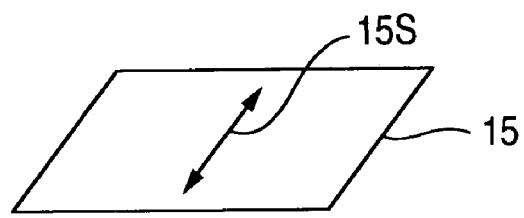
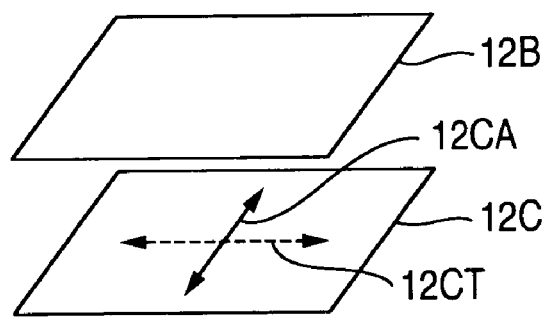

FIG.5
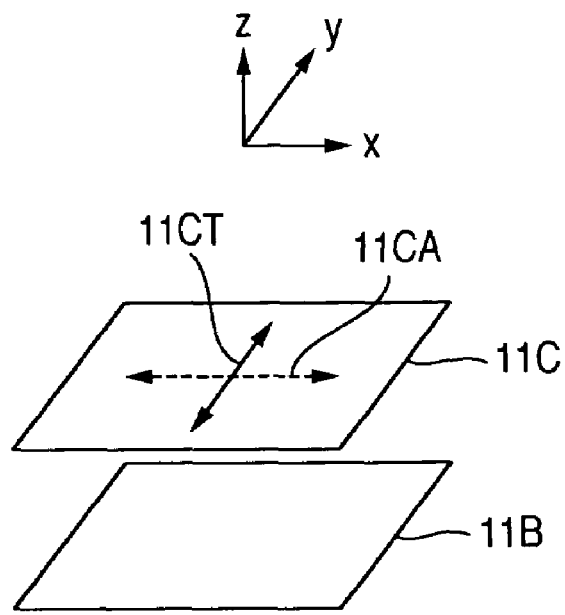
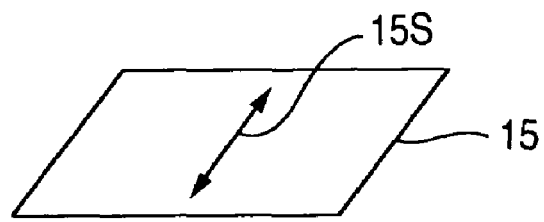
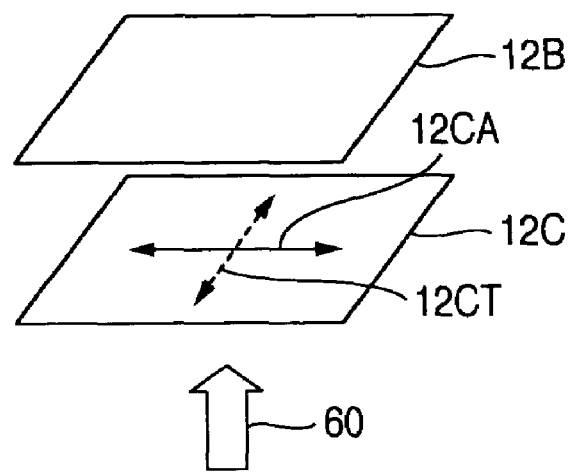

FIG.32A
FIG.32B
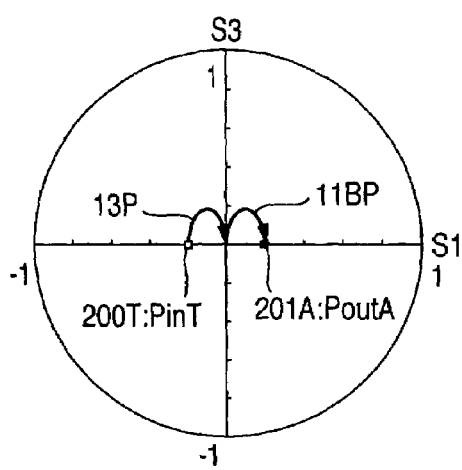
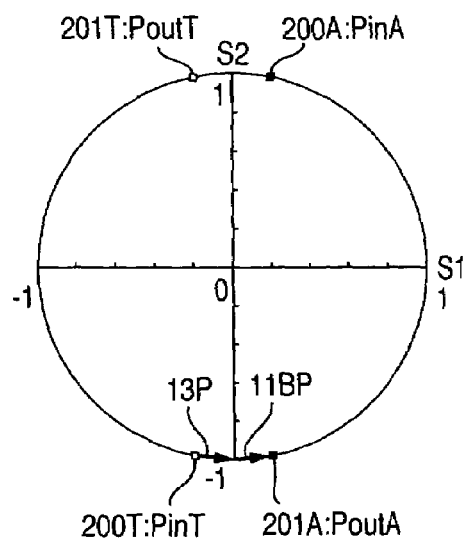
FIG.33
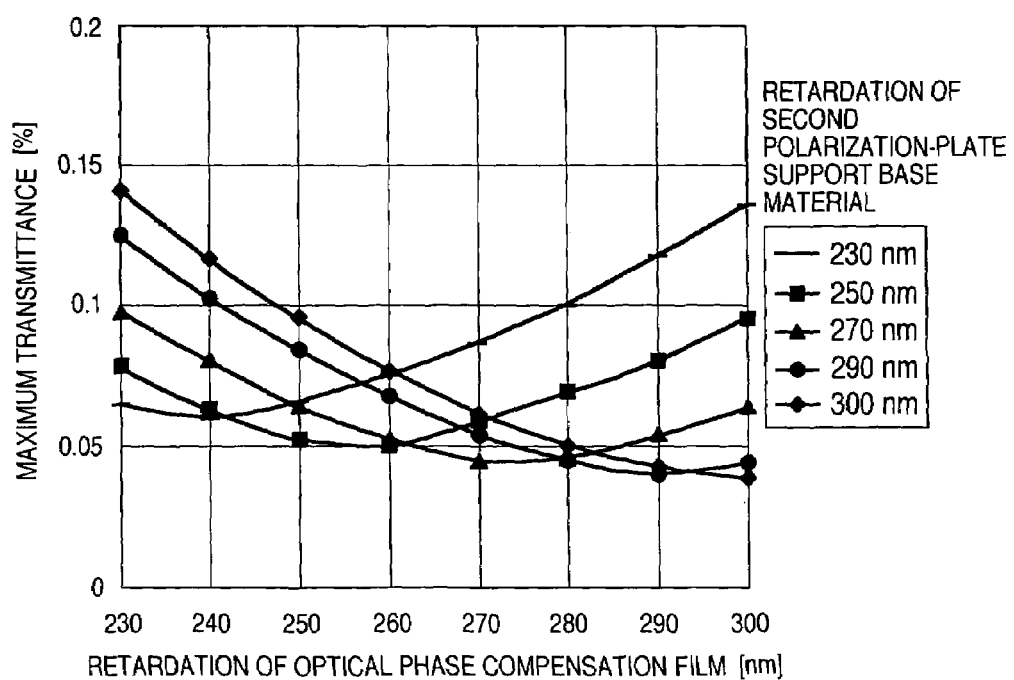

FIG.36A
FIG.36B
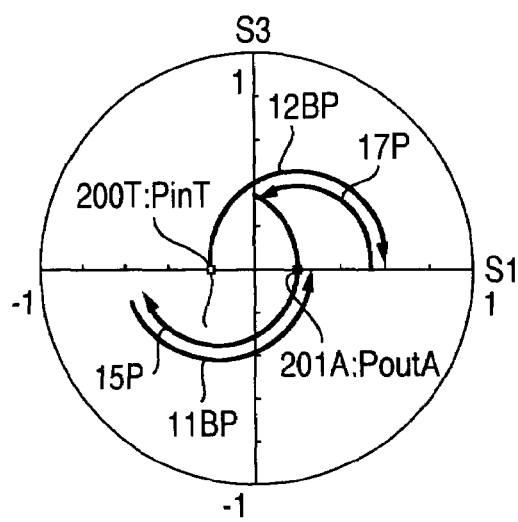
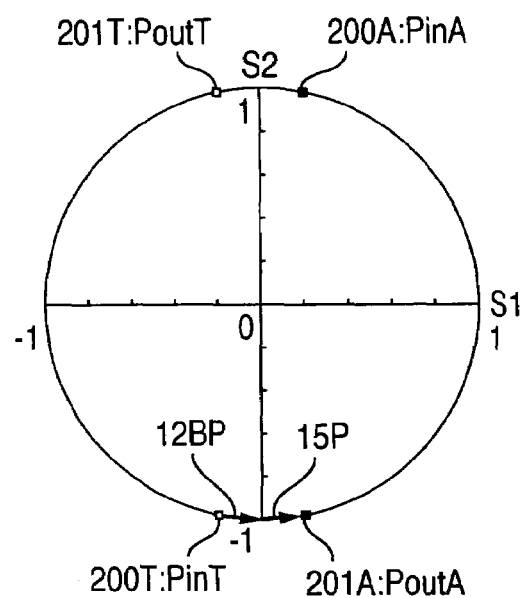
FIG.37A
FIG.37B
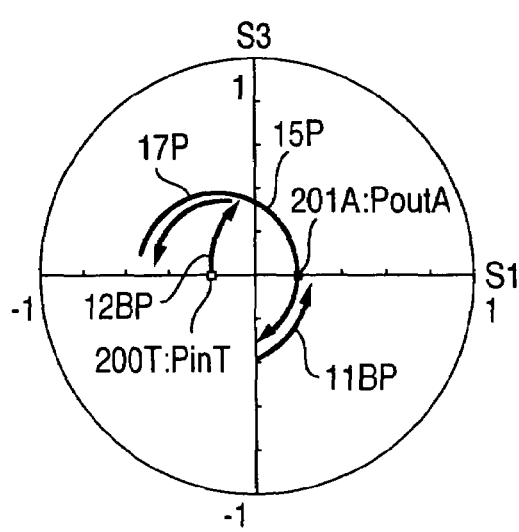
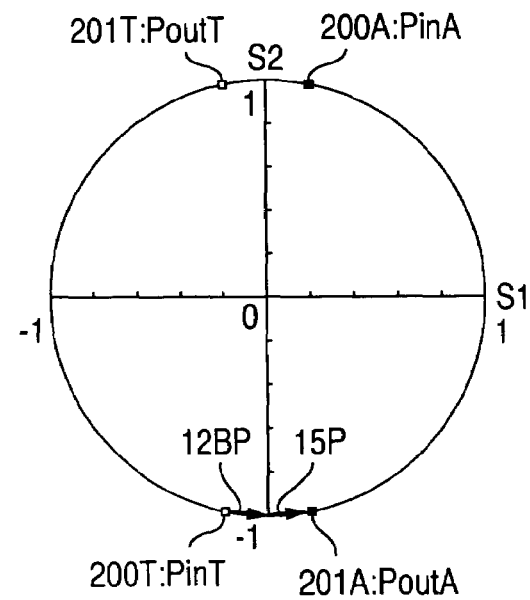

FIG.38
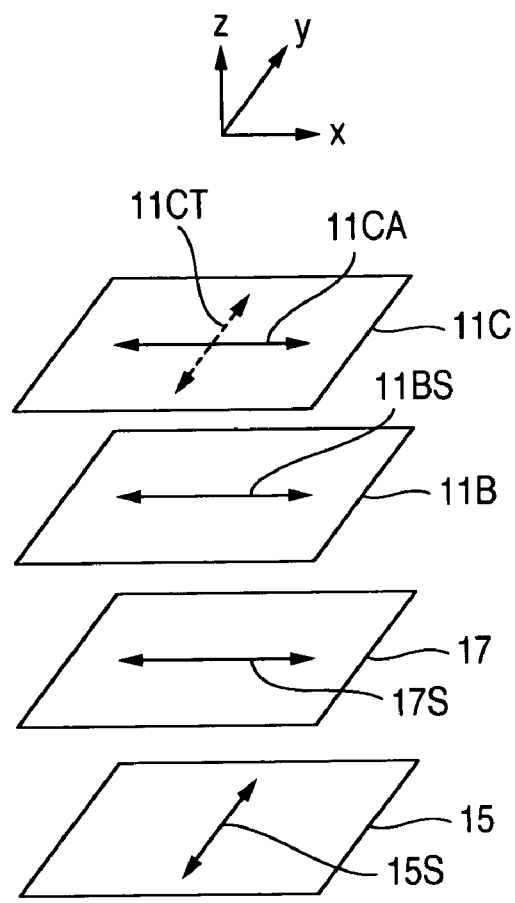
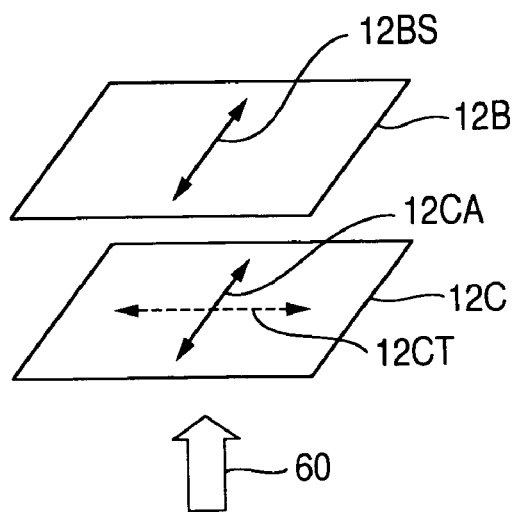

FIG.40
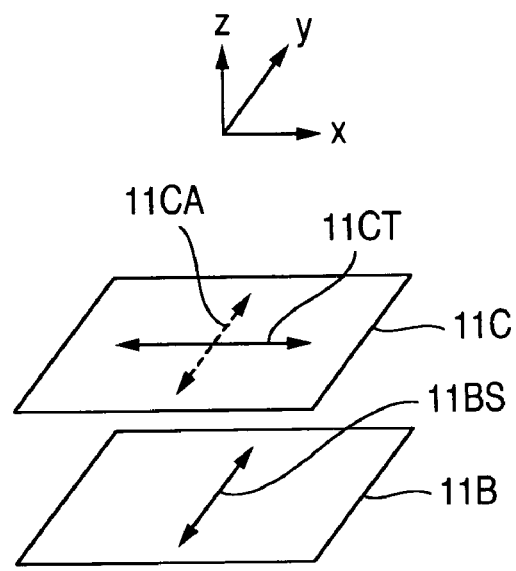
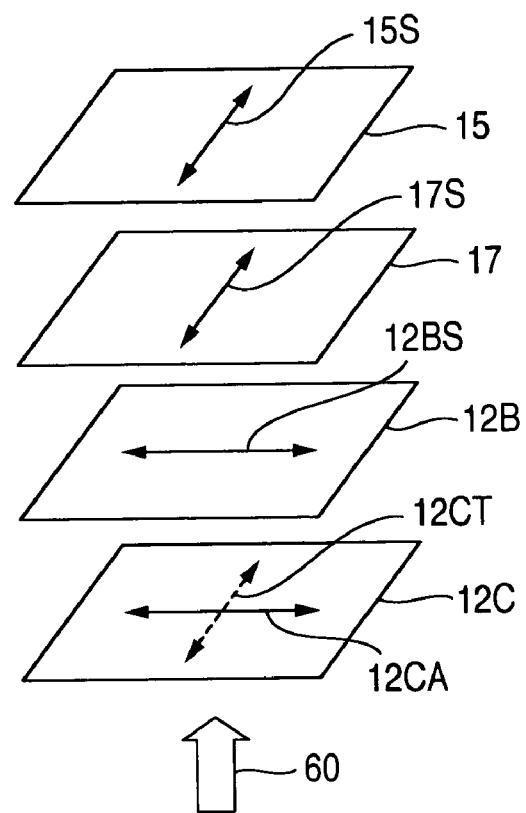

FIG.42
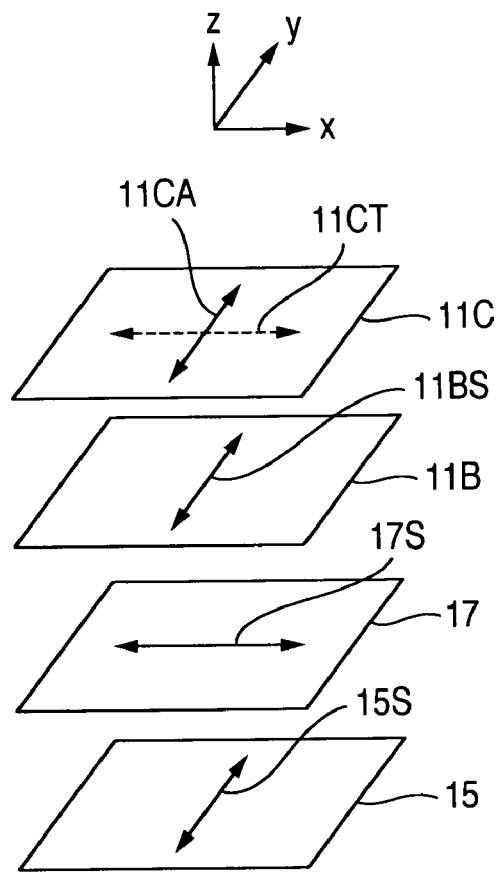
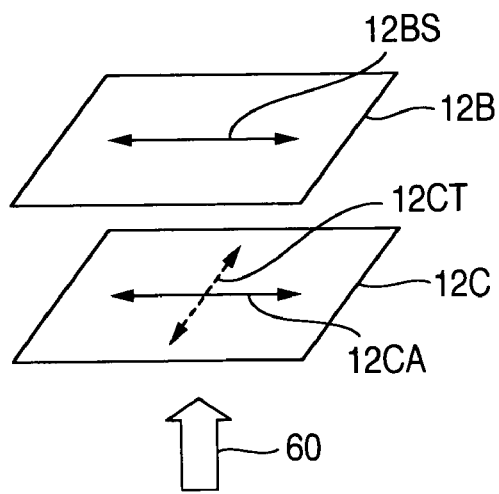

FIG.43A
FIG.43B
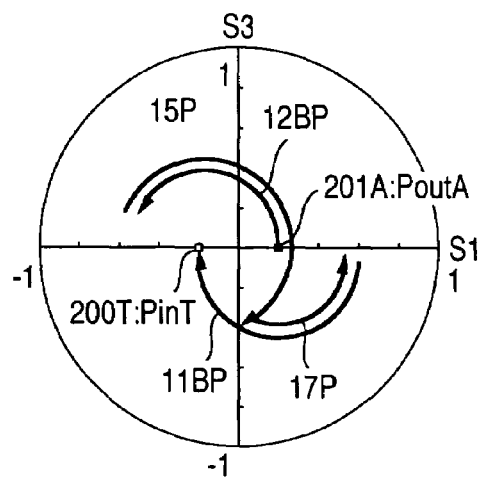
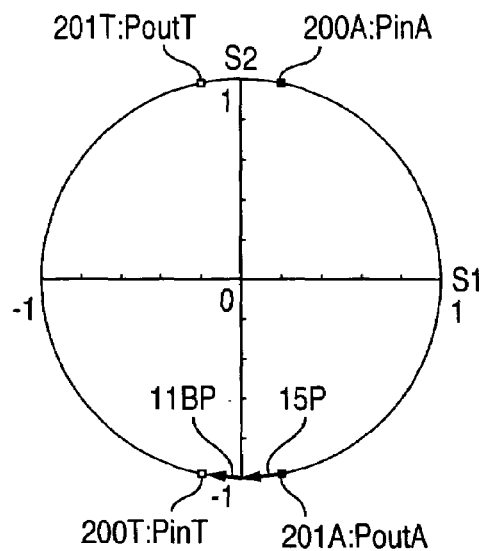
FIG.44A
FIG.44B
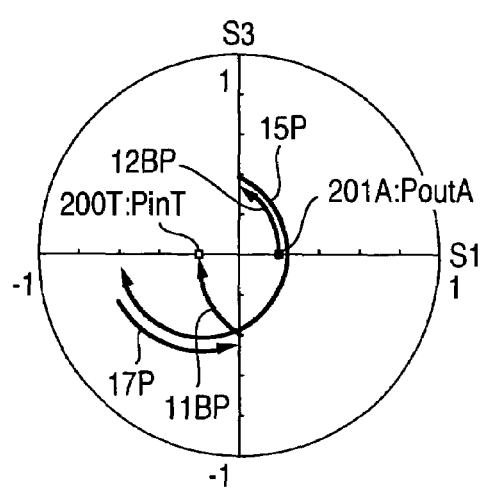
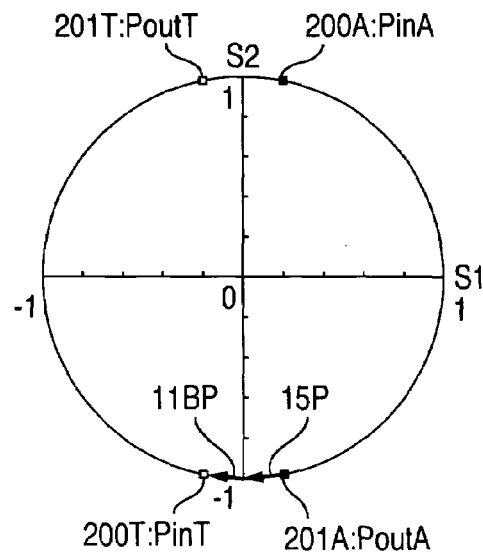

LIQUID CRYSTAL DISPLAY APPARATUS

BACKGROUND OF THE INVENTION

The present invention relates to a liquid crystal display apparatus displaying black representation, particularly to an in-plane-switching-mode (IPS) liquid crystal display apparatus in which liquid crystal molecules are homogeneously oriented to control transmittance of light by applying a horizontal electric field to the liquid crystal molecules and a great improvement of its viewing angle characteristics (particularly, displaying black representation and low gray levels).

As a method for applying the direction of an electric field to liquid crystal in the direction parallel with a substrate (hereafter referred to as horizontal electric field method or IPS mode), a method using a comb-teeth electrode provided on one substrate is disclosed in JP-B-63-21907, JP-A-9-80424, and JP-A-2001-056476. Because a liquid-crystal molecule rotates mainly in a plane parallel with a substrate, it is known that the difference between birefringence at the time of electric field application and at the time of no electric field application viewed from a diagonal direction is small and the viewing angle is wide.

However, in the IPS mode, it is known that light leaks depending on the characteristic of the polarizer when viewing from a diagonal direction, which is in an orientation deviated from the absorption axis of a polarizer, while a change of the double refraction factor of liquid crystal is small. To eliminate the diagonal light leak of the polarizer, a method for using a retardation film is disclosed in JP-A-2001-350022. However, though this document basically considers the improvement of viewing angle of only a polarizer and influence of liquid crystal for a VA mode, a method for compensating the influence by a liquid crystal layer is not disclosed for the IPS mode.

Moreover, means for solving a problem of a color change of white depending on an observation direction is disclosed in Japanese Patent No. 3204182. However, improvement of black representation characteristic is not described.

Furthermore, Japanese Patent No. 2982869 discloses a configuration for placing a wave plate on one inner side of a polarizer in order to improve the viewing angle characteristic of black display. However, it has been found by our study that though this method considers the influence of a support base material TAC (tri-acetylcellulose) provided on both sides of the polarizer, black does not completely dark at a diagonal viewing angle with phase compensation by one sheet at either side and that the method does not provide a configuration which decreases coloring due to wavelength dispersion in the liquid crystal layer. Moreover, it does not disclose phase compensation differences depending on whether the orientation axis (lag axis) of a liquid crystal molecule at the time of black representation is parallel with or vertical to the polarizer at the incoming side, which is our invention. In the case of the above-described well-known example, the visual-angle characteristic is discussed only by brightness characteristic but the corresponding method to this color change is not disclosed.

SUMMARY OF THE INVENTION

A problem to be solved is that increase of brightness and coloring could occur in a diagonal direction in an in-plane-switching-mode (IPS) liquid crystal display apparatus in which a liquid crystal molecule has homogeneous orientation at the time of black display and which controls transmission and cutoff of light by applying a horizontal electric field to the liquid crystal molecule.

The IPS mode uses two polarizers arranged so that a liquid crystal molecule having homogeneous orientation in horizontal direction and an absorption axis are orthogonal in vertical and horizontal directions for the screen front. Therefore, when viewing the screen from vertical and horizontal directions, absorption axes of two polarizers are orthogonal and homogeneous-orientation liquid crystal molecule and one-hand polarization-plate absorption axis are parallel. Therefore, it is possible to sufficiently decrease black luminance. However, because the angle formed between absorption axes of two polarizers is deviated from 90°, thereby transmitted light causes double refraction, and light leaks when diagonally viewing the screen from the direction of an azimuth angle of 45°, so that it is impossible to sufficiently decrease black luminance. Moreover, an amount of diagonal leaked light depends on a wavelength, and coloring occurs. Therefore, it is an object of the present invention to provide means for decreasing luminance rise and coloring of black display when viewing black display from a diagonal direction in order to obtain preferable display at every angle of the whole azimuth on black display in the IPS mode. Furthermore, the IPS mode has a problem that when viewing the IPS mode from the front, particularly at the time of black display, in-screen display irregularity and contrast ration decrease tend to occur. The present invention also provides means for improving these problems by using the optical phase compensation technique.

The present invention is a liquid crystal display apparatus including a liquid crystal layer in which absorption axes of a first substrate having a light-incoming-side polarizer and a second substrate having a second polarizer are almost vertical (smaller angle ranges between 88 and 90°) and a liquid crystal molecule is oriented so as to be parallel with the substrates and almost vertical to or almost parallel (smaller angle ranges between 0 and 2°) with the absorption axis of the first polarizer and rotates on a plane parallel with the first substrate by applying an electric field in the direction parallel with the first substrate and a matrix-driven electrode group having a pair of electrodes by facing each pixel is provided and a back illumination apparatus is included, the first and second polarizers are polarizers respectively having a support base material at both sides of a polarization layer and the support base material has a double refraction property (retardations in plane and in thickness direction are 10 nm or more), an optical member or film having double refraction property is provided to the liquid crystal layer side of the first or second substrate, a refraction factor is almost isotropic (retardations in the plane and the thickness direction are 10 nm or less) when laminating the polarization-plate support base material contacting with the substrate on which the optical member or film is provided and the optical member or film or absorption axes of a first substrate having a first polarizer at the light incoming side and a second substrate having a second polarizer are almost vertical (smaller angle ranges between 88 and 90°), a liquid crystal molecule is oriented in parallel with the substrates and almost vertical to or almost parallel (smaller angle ranges between 0 and 2°) with the absorption axis of the first polarizer, and the liquid crystal molecule rotates in a plane parallel with the first substrate by applying an electric field in the direction parallel with the first substrate, a matrix-driven electrode group having a pair of electrodes by facing each pixel is provided to the side of either of the first substrate or the second substrate whichever is closer to the liquid crystal layer. The first and second polarizers are respectively a polarizer having a support base material at both sides of a polarization layer, the support base material has double refraction property (retardations in plane and thickness direction are 10 nm or more), a support base material provided to the liquid-crystal layer sides of the first and second polarizers respectively show almost-equal double refraction property (retardation differences in the plane and thickness direction are 20 nm or less) and an optical phase compensation member having double refraction property (retardation difference in the plane or thickness direction is 20 nm or more) is provided between the liquid crystal layer and the second substrate.

Other means will be described in embodiments in detail.

A liquid crystal display apparatus of the present invention can decrease the influence of a liquid crystal layer in a diagonal visual field by a configuration using a polarizer, liquid crystal layer, and optical phase compensation member and specifying the phase difference of each optical phase compensation member.

Other objects, features and advantages of the invention will become apparent from the following description of the embodiments of the invention taken in conjunction with the accompanying drawings.

BRIEF DESCRIPTION OF THE DRAWINGS

FIG. 3 is a perspective view showing an embodiment of a liquid-crystal display apparatus of the present invention;

FIG. 5 is a perspective view showing an embodiment of a liquid-crystal display apparatus of the present invention;

FIGS. 32A and 32B are illustrations respectively showing Poincare sphere display for explaining an embodiment of the present invention;

FIG. 33 is a characteristic diagram of an embodiment of the present invention;

FIGS. 36A and 36B are illustrations respectively showing Poincare sphere display for explaining an embodiment of the present invention;

FIGS. 37A and 37B are illustrations respectively showing Poincare sphere display for exampling an embodiment of a liquid-crystal display apparatus of the present invention;

FIG. 38 is a block diagram showing an embodiment of the present invention;

FIG. 40 is a block diagram showing an embodiment of the present invention;

FIG. 42 is a block diagram showing an embodiment of the present invention;

FIGS. 43A and 43B are illustrations respectively showing Poincare sphere display for explaining an embodiment of the present invention;

FIGS. 44A and 44B are illustrations respectively showing Poincare sphere display for explaining an embodiment of the present invention;

DETAILED DESCRIPTION OF THE EMBODIMENTS

Contents of the present invention are specifically described below.

While a liquid-crystal TV becomes conspicuous, the following is important for a liquid crystal display which is not light-emitting: how to transmit the light from an illumination apparatus at the time of white display and how to cut off the light at the time of black display. The present invention particularly relates to how to eliminate coloring in addition to reduction of luminance when viewing black display from a diagonal direction.

Figure 7:
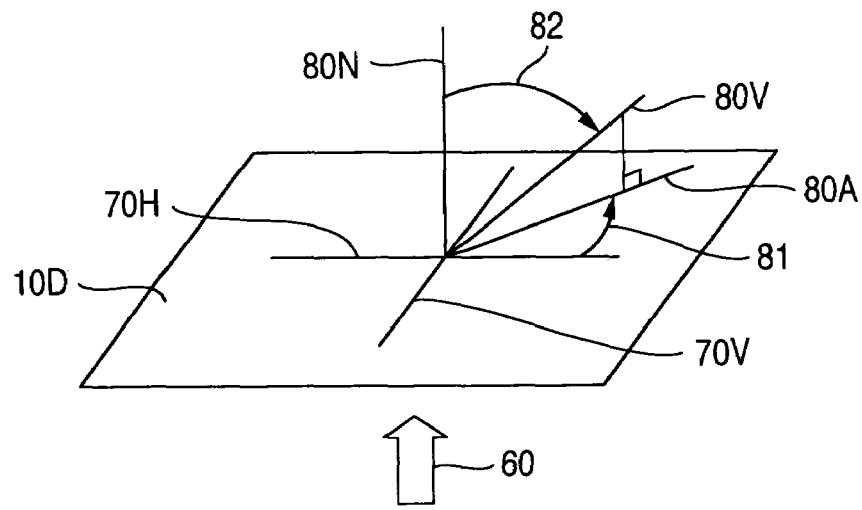
FIG. 7 is a definition diagram for explaining a liquid-crystal display apparatus of the present invention.

First, definition is described by referring to FIG. 7 before describing why luminance rises and coloring occurs when viewing black display from a diagonal direction. When light 60 comes in from an illumination apparatus, the light is modulated by a liquid crystal device, and the light is emitted from a display face 10D and when assuming that the normal direction of the display face 10D as 80N, horizontal direction of it as 70H, vertical direction of it as 70V, visibility direction as 80V, viewing angle 82 as θ, projection of the visibility direction 80V on the display face 10D as 80A, an angle formed with the horizontal direction 70H is shown by Φ by assuming an azimuth angle as 81.

Figure 9A:
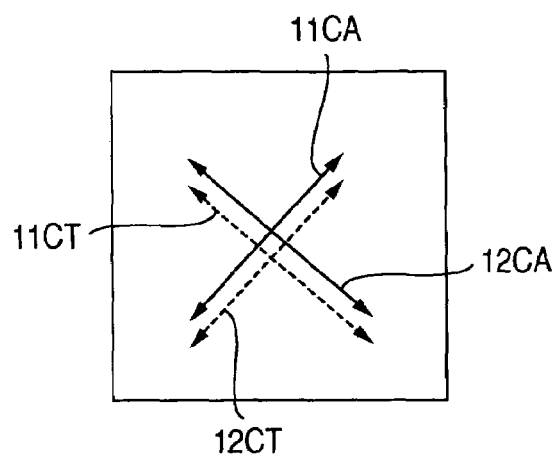
FIGS. 9A and 9B are conceptual views for explaining a liquid-crystal display apparatus of the present invention.
Figure 9B:
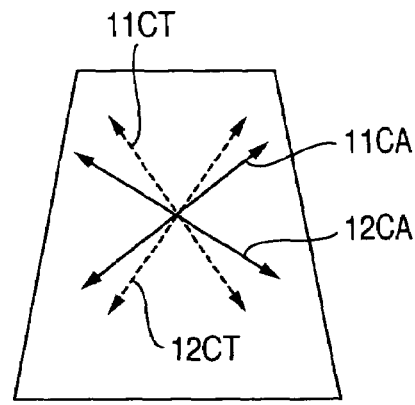

Then, in the case of a pair of polarizers orthogonal to each other, the reason of light leak is considered by assuming the viewing angle θ and azimuth angle Φ as θ≠0°, Φ=0°, and 180°±90°. As shown in FIG. 9A, when orthogonalizing absorption axes 11CA and 12CA (or transmission axes 11CT and 12CT) of two polarizers, the light incoming from the normal direction of the polarizers becomes a straight-line polarized light by the polarizer at the incoming side, absorbed by the polarizer at the outgoing side, and black display is realized. However, as shown in FIG. 9B, when viewing from a diagonal direction (θ≠0°, Φ≠0°, and 180°±90°), a component parallel with the transmission axis of the opposite-side polarizer is included, light is not completely cut off by the opposite-side polarizer, and light leaks. Moreover, the following is clarified by our study. When a parallel-oriented liquid crystal layer is provided between polarizers orthogonal to each other, there is not the influence of the liquid crystal layer when the orientation axis of the liquid crystal layer is parallel with the absorption axis of the incoming-side polarizer. However, when the orientation axis of the liquid crystal layer is shifted or two polarizers are shifted from the orthogonal state, there is the influence of the liquid crystal layer.

To understand these polarized states, it is very preferable to use Poincare sphere display. The Poincare sphere display is disclosed in Japan Society of Applied Physics Optics Gathering for Friendly Discussion "Crystal Optics" printed by MORIKITA SHUPPAN Co., Ltd., First Edition Fourth Issue in 1984, Chapter 5, pp. 102-163. When taking x and y axes on a face vertical to the traveling direction of light, assuming the electric field amplitudes as Ex and Ey and the relative phase difference between Ex and Ey as δ(=δy−δx), Stokes parameters S0, S1, S2, and S3 are shown by the following expressions.

$S0=<|Ex|^2>+<|Ey|^2>$ $S1=<|Ex|^2>-<|Ey|^2>$ $S2=<2ExEy \cos \delta>$ $S3=<2ExEy \sin \delta>$  (Expression 1)

Figure 8:
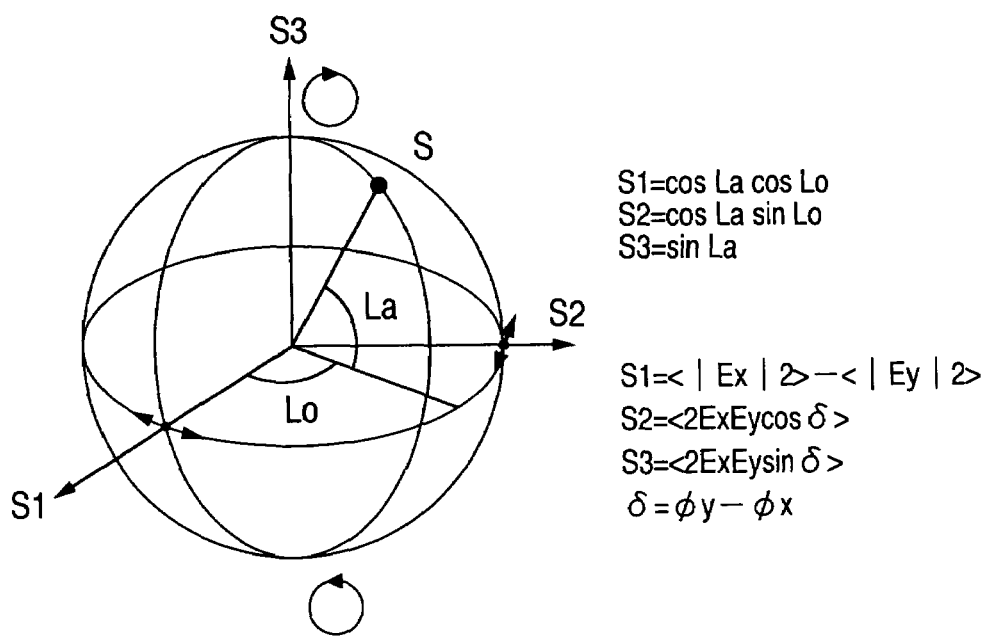
FIG. 8 is a typical Poincare sphere display for explaining a liquid-crystal display apparatus of the present invention.

In the case of complete polarization, $S0^2$ is equal to $S1^2+S2^2+S3^2$. Moreover, when displaying it on the Poincare sphere, FIG. 8 is obtained. That is, when taking S1, S2, and S3 to axes of a spatial orthogonal coordinate system, a point S showing a polarized state is located on a sphere having a strength S0 as the radius. When taking a point in a polarized state S, displaying it by using the latitude La and longitude Lo, and considering a sphere having a radius of 1 because $S0^2$ is equal to $S1^2+S2^2+S3^2$ in the case of complete polarization;

$S1=\cos La \cos Lo$, $S2=\cos La \sin Lo$, $S3=\cos La$.  (Expression 2)

In this case, on the Poincare sphere, clockwise polarized light is provided on the upper semisphere, counterclockwise polarized light is provided on the lower semisphere, linear polarized light is provided on the equator, and right-handed circularly polarized light and left-handed circularly polarized light are provided on upper and lower poles.

Figure 10A:
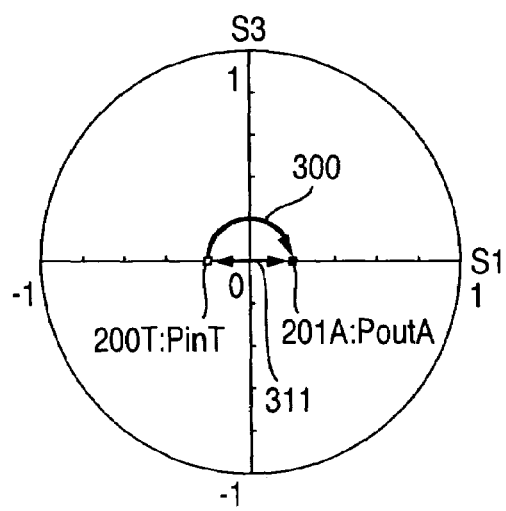
FIGS. 10A and 10B are illustrations respectively showing Poincare sphere display for explaining a liquid-crystal display apparatus of the present invention.
Figure 10B:
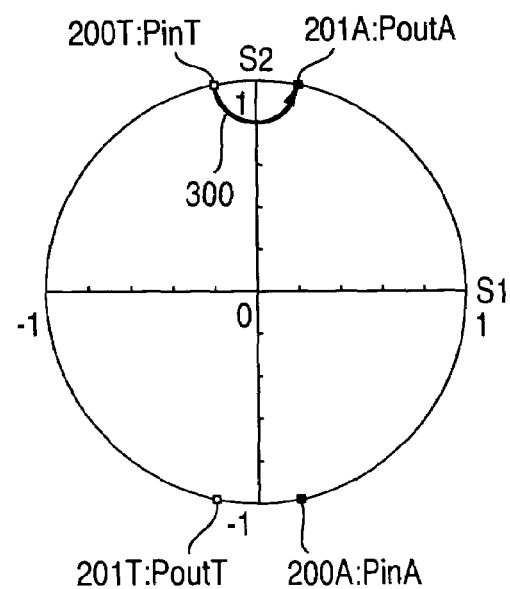

When considering the states in FIGS. 9A and 9B on the Poincare sphere, FIGS. 10A and 10B are obtained. In this case, FIGS. 10A and 10B show a case of viewing them at an azimuth angle Φ of 45° and θ of 60°. FIG. 10B shows projection to S1-S2 face and FIG. 10A shows projection to S1-S3 face. The polarized state of a polarization transmission axis 12CT at the light incoming side is shown by 200T, straight-line polarized light having a polarized-light component on an absorption axis 12CA is shown by 200A, a polarization transmission axis 11CT at the outgoing side is shown by 201T, and straight-line polarized light having a polarized-light component on the absorption axis 11CA is shown by 201A. That is, the distance 311 between 200T and 201A becomes light leak. Therefore, it is found that light leak can be eliminated by performing conversion 300 of the polarized state of 200T into the polarized state of 201A.

In FIGS. 10A and 10B, an ideal state of only a polarization layer is considered. However, in the case of a general polarizer plate, a support base material is supported by both sides of a polarization layer, the support base material is normally made of triacetylecellulose (TAC) and a phase difference in a face is hardly present but there is retardation R·h in the thickness direction. In this case, when making the slow axis in the face of the support base material parallel with x-axis direction and assuming refractive indexes in x- and y-axis directions as nx and ny, the refractive index in the thickness direction as nz, and the thickness as h, R·h is shown by the following expression.

$R \cdot h = ((nx+ny)/2 - nz) \cdot h$  (Expression 3)

Figure 1:
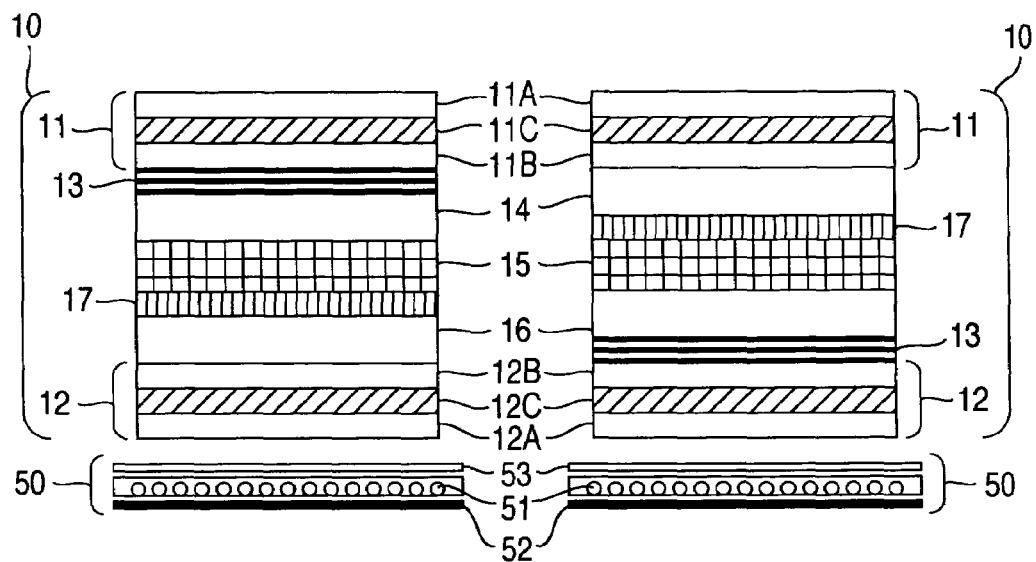
FIG. 1 is a cross-section diagram showing an embodiment of a liquid-crystal display apparatus of the present invention.
Figure 2:
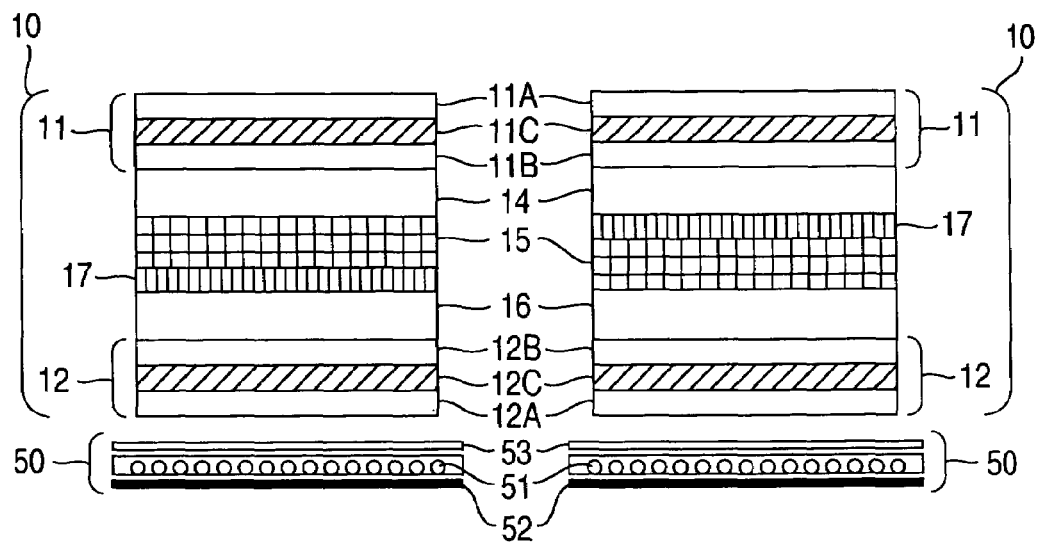
FIG. 2 is a cross-section diagram showing an embodiment of a liquid-crystal display apparatus of the present invention.

A polarized state is not influenced in the case of vertical incoming but a polarized state is changed by being influenced by a support base material at the time of diagonal incoming by the retardation R·h. In this case, a change of polarized states is considered in accordance with the optical layer configuration shown in FIG. 3. Polarizers 11 and 12 are arranged at both sides of a liquid crystal layer 15, a support base material 12B is provided to the inside of the incoming-side polarizer 12, and a support base material 11B is provided to the inside of outgoing-side polarizer 11. In this case, the orientation axis 15S of liquid crystal is provided so that it is parallel with the absorption axis 12CA and vertical to the transmission axis 12CT of the incoming-side polarizer 12 and vertical to the absorption axis of the outgoing-side polarizer 11CA and parallel with the transmission axis 11CT of the outgoing-side polarizer 11. This is referred to as o-mode. As shown in FIG. 5, when the axes of upper and lower polarizers rotate by 90°, that is, a case in which the orientation axis 15S of liquid crystal is provided vertically to the absorption axis 12CA of the incoming-side polarizer 12 and parallel with the transmission axis 12CT while parallel with the absorption axis 11CA of the outgoing-side polarizer 11 and vertical to the transmission axis 11CT is referred to as e-mode. Moreover, support base materials 11A and 12A are normally arranged to outsides of the polarization layers 11C and 12C as shown in FIGS. 1 and 2. In this case, for the configuration in FIG. 3, it is omitted because it not necessary when considering a polarized state. For the configuration in FIG. 3, a change of polarized states is considered on the Poincare sphere by using FIG. 11A. In this case, the optical anisotropy of the liquid crystal layer 15 is referred to as ΔnLC, the gap of it is referred to as dLC and the product ΔnLC·dLC is referred to as retardation. Hereafter, when there is no notice, each physical property value is considered as the value of light having a wavelength of 550 nm. When considering the light viewed from an azimuth angle Φ of 45° and viewing angle of 60° similarly to the case of FIGS. 10A and 10B, a polarized state of the light passing through the transmission axis 12CT of a polarization layer 12C becomes 200T and S1 axis is rotated by retardation R1·h1 of the polarization layer 12C clockwise viewed from −1 side and converted into left-handed elliptically-poralized light of a polarized state 202. Moreover, the light is rotated 301 by the retardation ΔnLC*dLC of the liquid crystal layer clockwise centering around the point of 200T by the liquid crystal layer 15 and converted into the clockwise elliptic polarized light of the polarized light state 203. Moreover, the S1 axis is rotated by retardation R2·h2 of the support base material 11B of the outgoing-side polarizer 11 viewed from −1 side and converted into clockwise elliptic polarized light in a polarized state 204. In this case, a polarized state coinciding with the absorption axis 11CA of the outgoing-side polarization layer 11C is 201A and light leaks by the distance 310 between the polarized states 204 and 201A.

Figure 11A:
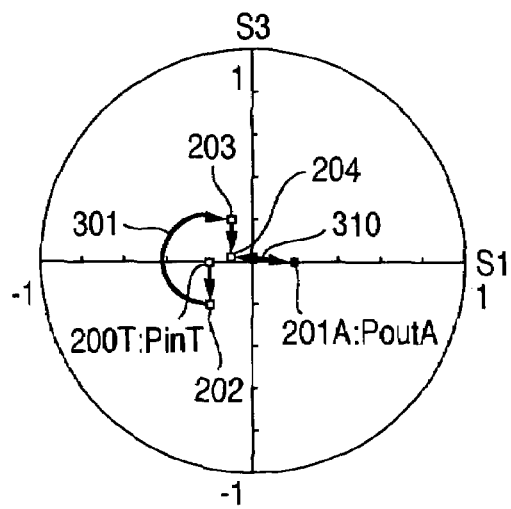
FIGS. 11A and 11B are illustrations respectively showing Poincare sphere display for explaining a liquid-crystal display apparatus of the present invention.
Figure 11B:
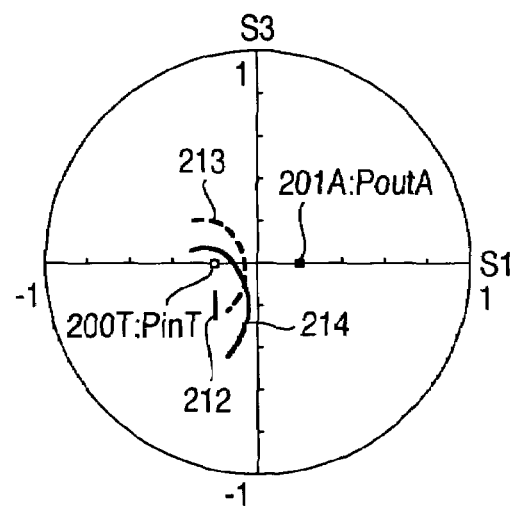

Moreover, light of 550 nm is considered for FIG. 11A. In the case of the configuration in FIG. 4, a visible light area ranges between 380 and 780 nm in FIG. 11B. Therefore, the light of 400 to 700 nm almost equivalent is considered. When considering the light viewed from an azimuth angle Φ of 45° and viewing angle θ of 60°, a polarized state of the light passing through the transmission axis 12CT of the polarization layer 12C becomes 200T and the S1 axis is rotated clockwise by the retardation R1·h1 of the support base material 12B when viewing S1 axis from −1 side and light is converted into counterclockwise elliptic polarized light of the polarized state 212. In this case, because retardation depends on a wavelength, it is shown that light is converted into a polarized light state depending on the wavelength of light. Moreover, the light is rotated by the retardation ΔnLC·dLC of the liquid crystal layer clockwise centering around the point of 200T by the liquid crystal layer 15 and converted into the elliptic polarized light of the polarized light state 213 having a spread depending on a wavelength. As shown in FIG. 11B, the light becomes counterclockwise elliptic polarized light at a short wavelength but becomes clockwise elliptic polarized light at a long wavelength. Furthermore, by rotating the S1 axis clockwise when viewing it from −1 side by retardation R2·h2 of the support base material 11B of the outgoing-side polarizer 11 and the light is converted into the elliptic polarized light in the polarized state 214. In this case, it is found that a polarized state coinciding with the absorption axis 11CA of the outgoing-side polarization layer 11C is 201A and light leaks by the distance between polarized states 214 and 201A and light leak quantity depends on a wavelength. Therefore, it can be understood that coloring occurs when viewing from a diagonal direction.

From the above mentioned, it is known that light leak and coloring at a diagonal viewing angle at the time of black display of the IPS-mode liquid-crystal display apparatus are greatly different from the case of orthogonal-layout polarizer.

Moreover, according to this idea, it is found that a polarized-state change by a liquid crystal layer most contributes to coloring. That is, it is a problem to decrease light leak in a diagonal direction while decreasing the influence of a liquid crystal layer at a diagonal viewing angle at the time of black display by an optical phase compensation member. The present invention solves the problem.

The present invention is described below. FIG. 1 shows a configuration of a liquid-crystal display apparatus of the present invention. The liquid-crystal layer 15 in which a liquid-crystal molecule rotates in a plane parallel with a first substrate 16 is held by two substrates 14 and 16 by almost vertically arranging absorption axes of the first substrate 16 having the first light-incoming-side polarizer 12 and second substrate 14 having the second polarizer 11 (smaller angle ranges between 88 and 90°), orienting liquid-crystal molecules in the direction parallel with the substrates 14 and 15, and applying an electric field in the direction parallel with the first substrate 16. Moreover, support base materials 11B and 12B of the polarizers 11 and 12 at the liquid-crystal layer side respectively have double refraction property. Furthermore, a matrix-driven electrode group having a pair of electrodes by facing each pixel is provided to the side close to the liquid-crystal layer 15 of the first substrate 16 or second substrate 14 and an illumination apparatus 50 is provided to the back. The left of FIG. 1 shows the case of o-mode in which the optical axis of the liquid-crystal layer 15 is parallel with the absorption axis of the incoming-side polarizer 12 and vertical to the transmission axis of the plate 12. In this case, an optical phase compensation member 13 is held between the liquid-crystal layer 15 and the second polarizer 11 as shown in the left of FIG. 1. Moreover, an optical phase compensation member 17 is provided between the support base material 12B and the liquid-crystal layer 15. Furthermore, when laminating the polarization-plate support base material 12B and the optical phase compensation member 17, the refraction factor almost becomes isotropic.

Figure 4:
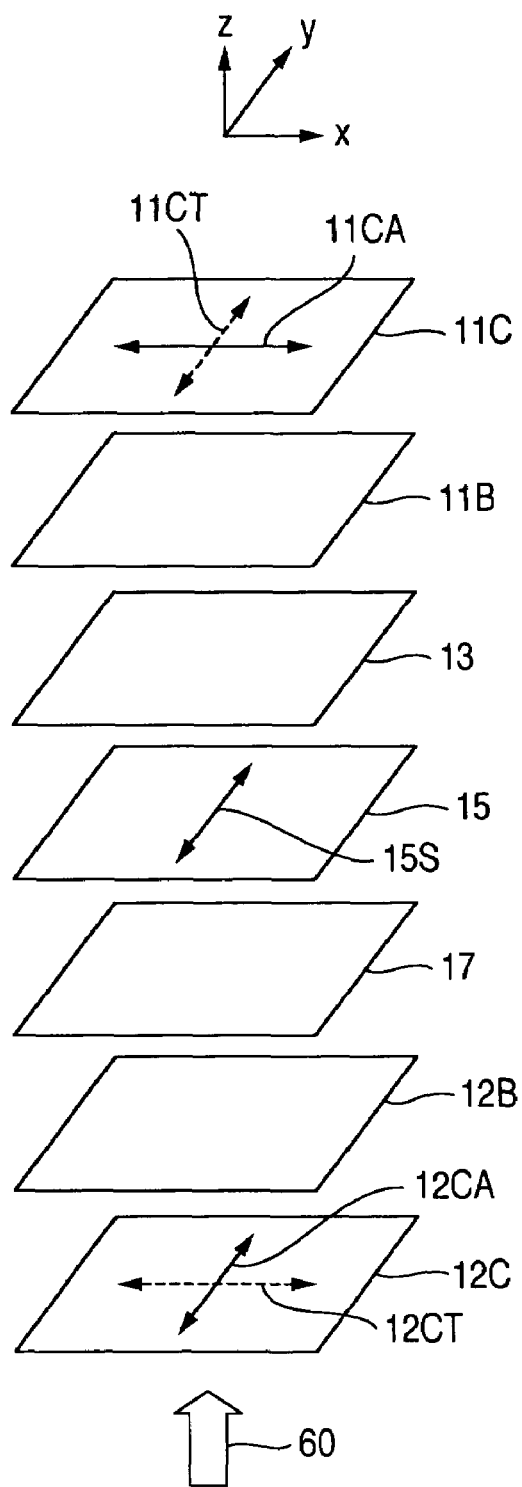
FIG. 4 is a perspective view showing an embodiment of a liquid-crystal display apparatus of the present invention.

Though FIG. 1 includes polarizer support base materials 11A and 12A and substrates 14 and 16, they can be ignored when considering a polarized state. When omitting them and considering an optical block diagram showing the axis direction of each member, FIG. 4 is obtained. In the case of this optical configuration, a method for reducing light leak from a diagonal direction by optical phase compensation members 13 and 17 is considered.

FIGS. 12A and 12B and FIGS. 13A and 13B show polarized state changes by using a Poincare sphere. The polarized state of the light diagonally incoming to the first polarizer 12 is shown as 200T as described above. In the case of the configuration in FIG. 4, the polarizer 12B has double refraction property. However, because this influence is canceled by the optical phase compensation member 17, incoming light enters the liquid-crystal layer 15 while keeping the polarized state 200T. In this case, when assuming that a lag axis in the face of liquid-crystal molecules sealed in the liquid-crystal layer 15 is made parallel with x-axis direction, refraction index in x- and y-axis directions are nx and ny, the thickness-directional refraction index is nz, and in-plane retardation is Δn·dr, the following expressions are obtained.

$$nx > ny \approx nz$$

$$\Delta n \cdot dr = (nx - ny) \cdot dr \quad \text{(Expression 4)}$$

Figure 12A:
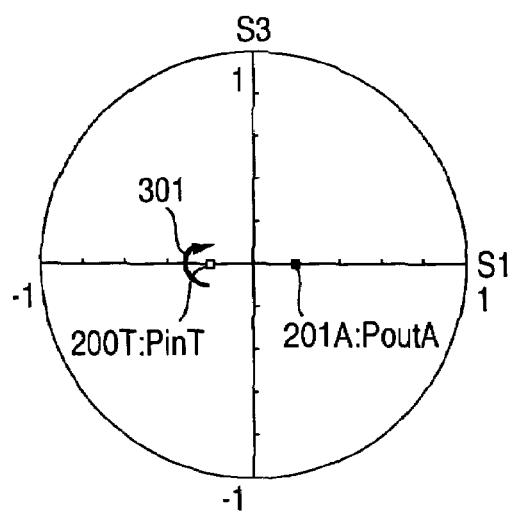
FIGS. 12A and 12B are illustrations respectively showing Poincare sphere display for explaining a liquid-crystal display apparatus of the present invention.
Figure 12B:
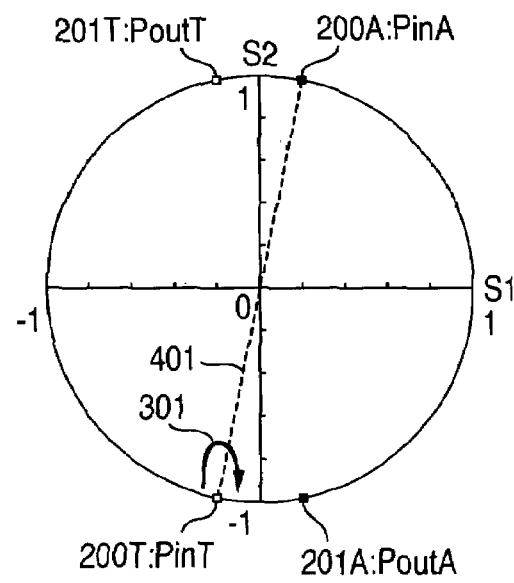

A medium which has a refraction anisotropy only in the face and whose thickness-directional refraction factor is almost equal to that of a medium having a small in-plane refraction index is referred to as a positive a-plate and hereafter, the retardation of the positive a-plate is referred to as in-plane retardation. A polarized-state change when straight-line polarized light enters the positive a-plate is shown by rotation conversion using the optical axis having a large refraction factor (y direction in this case), that is, using the lag axis as an axis on the Poincare sphere. In the case of the optical configuration in FIG. 4 which is now considered, the rotation conversion on the Poincare sphere is considered as shown in FIGS. 12A and 12B because the absorption axis of the first polarizer 12 coincides with the lag axis 15S of the liquid-crystal layer 15. That is, rotation conversion 301 is applied to the polarized state 200T after passing through the first polarizer 12 by using the lag axis 401 of the liquid-crystal layer 15 as an axis. Therefore, when the direction of the first-polarization-plate absorption axis 12CA accurately coincides with the direction of the lag axis 15S of the liquid-crystal layer 15, the polarized state is not changed after passing through the liquid-crystal layer 15.

Figure 13A:
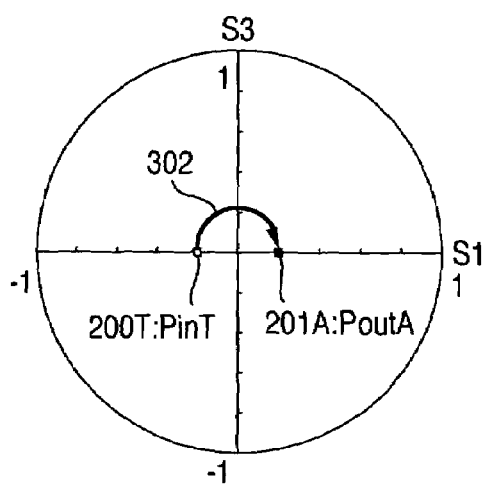
FIGS. 13A and 13B are illustrations respectively showing Poincare sphere display for explaining a liquid-crystal display apparatus of the present invention.
Figure 13B:
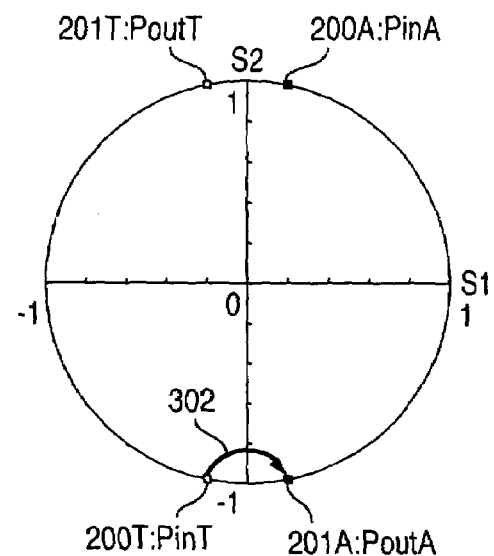

Then, polarized state changes before and after passing through the optical phase compensation member 13 and second polarizer support base material 11B are considered. As shown in FIGS. 13A and 13B, it can be understood that it is preferable to convert the polarized state 200T after passing through the liquid-crystal layer 15 into a straight-line polarized state 201A in the second polarizer absorption axis direction 11CA.

That is, in the case of o-mode, by canceling the double refraction of the first polarizer support base material 12B by the optical phase compensation member 17 set between the first polarizer support base material 12B and the liquid-crystal layer 15 and setting the optical phase compensation member 13 between the liquid-crystal layer 15 and the polarization layer 11C of the second polarizer, it is possible to eliminate the influence of the liquid-crystal layer on diagonally incoming light and reduce light leak. Because there is no influence of the liquid-crystal layer, it is possible to reduce coloring and light leak for diagonally incoming light.

Then, the case of e-mode shown in the right of FIG. 1 is considered. In this case, the optical phase compensation member 13 is held between the first polarizer 12 and the liquid-crystal layer 15 as shown by the right of FIG. 1. Moreover, the optical phase compensation member 17 is provided between the liquid-crystal layer 15 and the support base material 11B of the second polarizer at the liquid-crystal layer side. Furthermore, when laminating the polarizer support base material 11B and optical phase compensation member 17, the refraction factor becomes almost isotropic.

Figure 6:
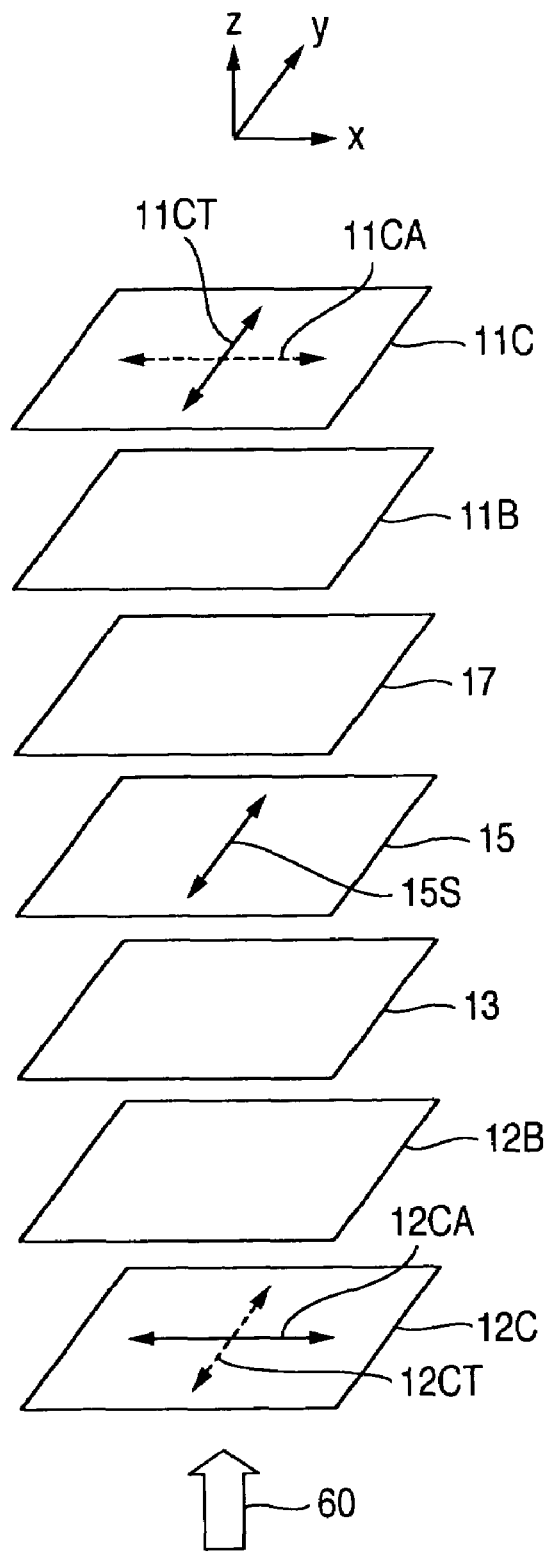
FIG. 6 is a perspective-view showing an embodiment of a liquid-crystal display apparatus of the present invention.
Figure 14A:
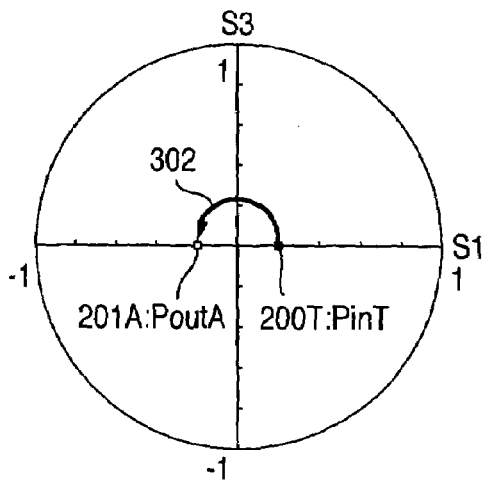
FIGS. 14A and 14B are illustrations respectively showing Poincare sphere display for explaining a liquid-crystal display apparatus of the present invention.
Figure 14B:
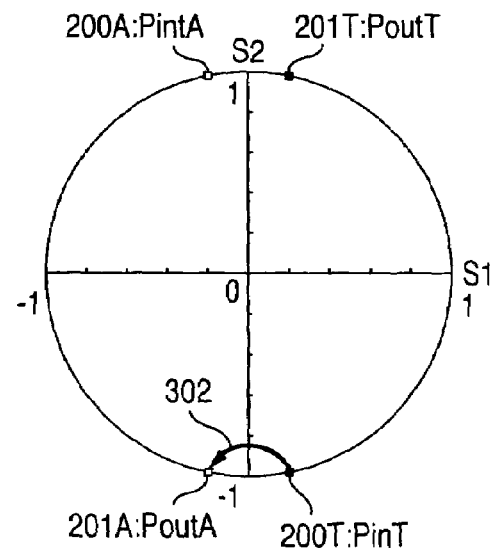
Figure 15A:
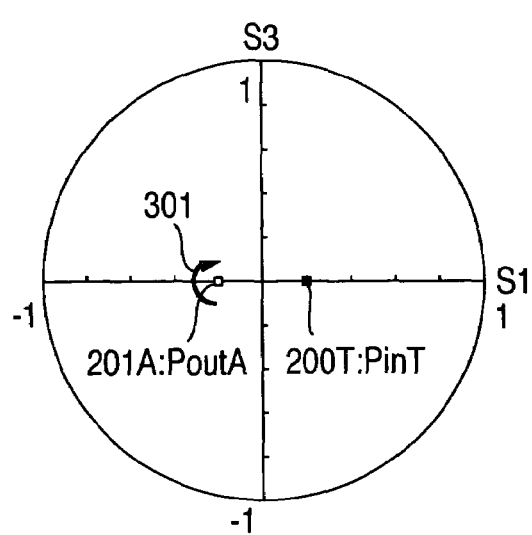
FIGS. 15A and 15B are illustrations respectively showing Poincare sphere display for explaining a liquid-crystal display apparatus of the present invention.
Figure 15B:
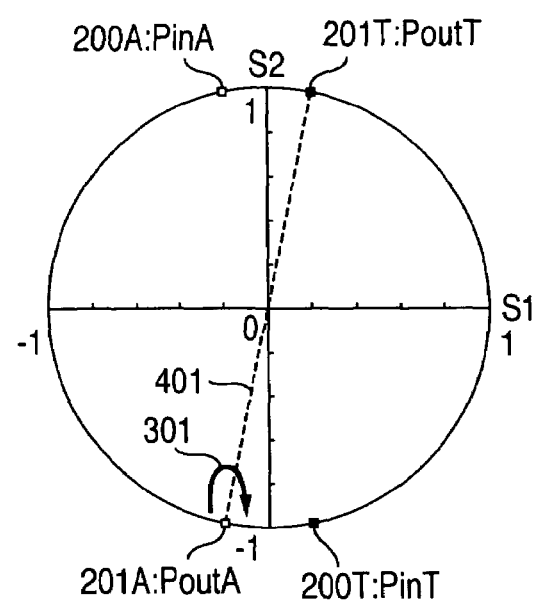

FIG. 6 shows an optical configuration. The polarized state change in this case is shown by using the Poincare sphere in FIGS. 14 and 15. FIGS. 14A and 14B show polarized state changes before and after passing through the first polarizer support base material 12B and optical phase compensation member 13. Thus, in the case of e-mode, the polarized state 200T after passing through the first polarizer 12 is converted into the straight-line polarized state 201A in the second polarization-plate absorption axis direction 11CA. Thereby, it is possible to make the lag axis-15S direction of the liquid-crystal layer coincide with the polarized direction of the light incoming to the liquid-crystal layer 15. In this case, polarized stage changes before and after passing through the liquid-crystal layer 15 are shown in FIGS. 15A and 15B as described above. That is, the influence of the liquid-crystal layer 15 is eliminated.

That is, in the case of e-mode, as shown in FIG. 6, by canceling the double refraction property of the second polarizer support base material 11B by the optical phase compensation member 17 set between the liquid-crystal layer 15 and the second polarizer support base material 11B and setting the optical phase compensation member 13 between the first polarization layer 12C of the first polarizer and the liquid-crystal layer 15, it is possible to eliminate the influence of the liquid-crystal layer on diagonal incoming light and reduce light leak. Because there is no influence of the liquid-crystal layer, it is possible to reduce coloring and light leak for diagonal incoming light.

Moreover, as shown in FIGS. 13 and 14, it is allowed to only reverse the direction for a polarized state change by the optical phase compensation member 13. Therefore, when using the proper layer configuration shown in FIG. 1 for cases of o-mode and e-mode and properly setting each axis of the optical phase compensation member 13 and when specifications (type, configuration, and retardation of optical phase compensation member) of the optical phase compensation member 13 are the same, viewing angle characteristics become almost equal at the time of black display in the cases of o-mode and e-mode.

In FIGS. 4 and 6, axis arrangements of a polarization-plate support base material and optical phase compensation member are not specified. However, when considering the contrast when viewing a liquid-crystal display apparatus from the front, it is preferable that these lag axes are vertical to or parallel with the absorption axis of a polarizer. Moreover, though the optical phase compensation member 17 for canceling the double refraction of the polarization-plate support base material is provided between a liquid-crystal layer and a substrate in FIG. 1, it is allowed that the member 17 is provided between a polarizer and a substrate when optical configurations in FIGS. 4 and 6 are satisfied.

The concept described up to now by using FIG. 1 is able to completely eliminate the influence of a liquid-crystal layer in a diagonal viewing angle and the viewing angle characteristic is preferable. However, because the configuration of the optical member at the first substrate-16 side is different from the configuration of the optical member (polarizer or optical phase compensation member) of the second substrate-14 side, there is a disadvantage that a configuration becomes complex. A polarizer and an optical phase compensation member are normally used by pasting them together. For example, in the case of the left configuration in FIG. 1, an object obtained by pasting the second polarizer and the optical phase compensation member 13 together is prepared and is pasted to the second substrate 14. Therefore, as shown in FIG. 1, in the case of the configuration in which the optical phase compensation member 13 is provided between the first polarizer and the first substrate or between the second substrate and the second polarizer, a step of pasting an optical member is increased. Moreover, because the optical member configuration at the first substrate-16 side is different from that at the second substrate-14 side, they are independently prepared and therefore, productivity is low. FIG. 2 shows a configuration for solving the problem.

In FIG. 2, the support base materials 12B and 11B of the first and second polarizers at the liquid-crystal layer side have almost the same optical characteristic. Differently from FIG. 1, an optical phase compensation member is not set between the first polarizer 12 and the first substrate 16 or between the second substrate 14 and the second polarizer 11. The above described polarized state change is realized in accordance with the optical characteristic of the optical phase compensation member 17 set between the first substrate 16 and the liquid-crystal layer 15 as shown at the left of FIG. 2 or optical characteristics of the optical phase compensation member 17 provided between the liquid-crystal layer 15 and the second substrate 14 as well as the support base materials 12B and 11B of the first and second polarizers at the liquid-crystal layer side. It is naturally allowed that the optical phase compensation member 17 is provided between the first substrate 16 and the liquid crystal layer 15 and between the liquid-crystal layer 15 and the second substrate 14 respectively. Particularly, when selecting a medium having an optical characteristic for canceling the double refraction of the liquid-crystal layer at a diagonal viewing angle as the polarization-plate support base materials 12B and 11B, the concept described by using FIG. 1 can be realized and the viewing angle characteristic becomes preferable.

The detailed example of the concept described above is shown in the following embodiments.

EMBODIMENTS

By showing specific examples below, the content of the present invention is more minutely described. The following embodiments show specific examples of the content of the present invention but the present invention is not restricted to these embodiments. In the case of the embodiments, a result of numerical calculation and study using an optical simulation using the 44 matrix method disclosed in the thesis title of J. Opt. Soc. Am. "Optics in Stratified and Anisotropic Media: 4×4-Martrix Formulation" written by D. W. Berreman 1972, volume 62, No. 4, pp 502-510 is included. In the case of the simulation, the spectral characteristic between three band cold cathode fluorescent lamp, spectral transmission characteristics of R, G, and B color filters are used and the spectral characteristic of 1224DU made by NITTO DENKO CORP. is used as a polarization-plate polarization layer. Moreover, nematic liquid-crystal having normal light refraction factor of 1.573 and abnormal light refraction factor of 1.484 is assumed as a liquid-crystal molecule included in a liquid-crystal layer and the thickness of the liquid-crystal layer is provided to 3.9 μm. Moreover, though wavelength dispersion of an optical phase compensation member uses one of polycarbonate (PC), polystyrene, norbornane, and liquid-crystal macromolecule, it is not restricted to but it is not restricted to them. Furthermore, in the case of the present invention, it is assumed to set an optical phase compensation member between a first substrate and a second substrate. However, this technique is disclosed in JP-A-2005-3733. According to our study, one of problems of the technique lies in the flatness of surface. When setting the optical phase compensation member between the first substrate and the second substrate and there is irregularity on the surface of the optical phase compensation member, the irregularity becomes fluctuation of the thickness of a liquid-crystal layer to cause in-plane display irregularity or contrast deterioration. However, according to our study, in the IPS mode using the fringe field electric field proposed in JP-A-2001-056476, in-plane display irregularity or contrast deterioration hardly occurs for thickness fluctuation of the liquid-crystal layer. Therefore, it is possible to easily combine the IPS mode with the technique for setting the optical phase compensation member between the first substrate and the second substrate.

Moreover, the expression such as vertical or 90° used in embodiments does not represent completely vertical. Therefore, even if rereading the expression as almost vertical or the smaller angle ranges between 88 and 90°, it does not influence the essence of the story. The same is applied to the expression such as parallel.

It is possible to directly use conventional liquid-crystal cell, electrode structure, substrate, polarization layer of polarizer objects having been used so far as IPS. The present invention relates to the specification and configuration of an optical member.

Moreover, a smaller angle (pretilt angle) for the substrate of a liquid-crystal-layer optical axis for a liquid-crystal layer while voltage is applied is provided to 0° in the simulation shown in embodiments. However, a large difference does not occur in the trend shown by this embodiment in a range of ±3°. However, the case of the pretilt angle of 0° shows the most preferable characteristic.

Embodiment 1

Figure 16:
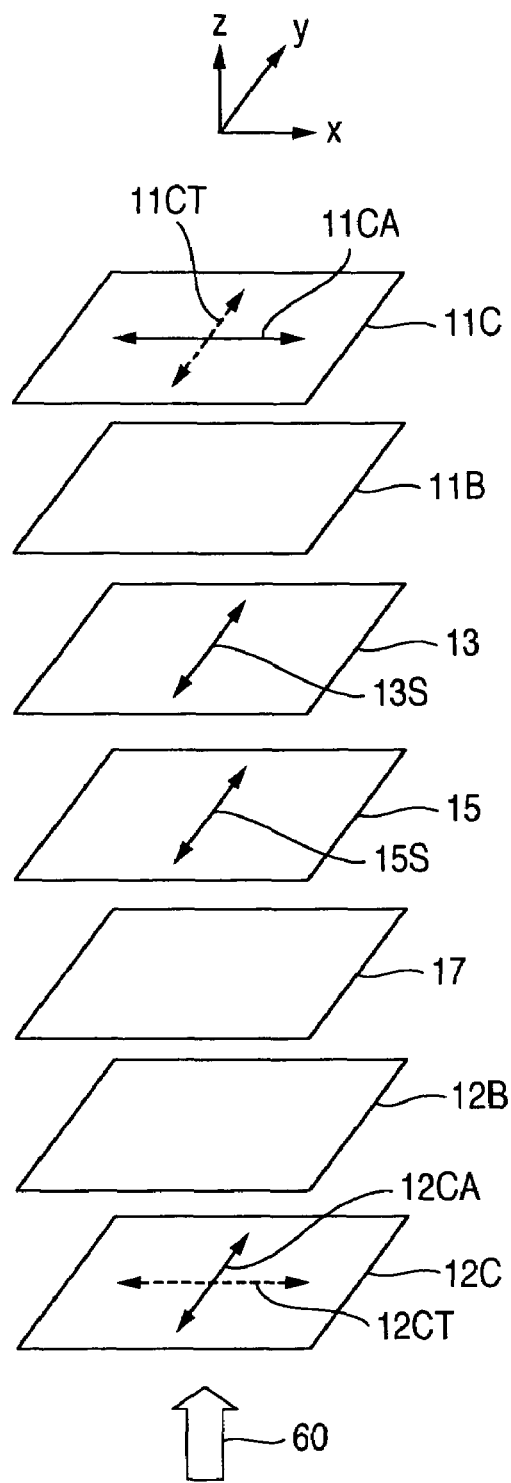
FIG. 16 is a block diagram showing an embodiment of a liquid-crystal display apparatus of the present invention.

FIG. 1 shows the structure of this embodiment and FIG. 16 shows the optical structure in o-mode. This embodiment uses one optically biaxial optical phase compensation film having an Nz coefficient between 0 and 1 (both excluded). The Nz coefficient denotes a quantity frequently used when expressing the double refraction of a medium having two-axis anisotropy on a refraction factor. When assuming that the lag axis in face is parallel with x-axis direction, refraction factors in x- and y-axis directions are nx and ny, and z axes, that is, in the thickness direction is nz, the Nz coefficient is shown by the following expression.

$$Nz=(nx-nz)/(nx-ny) \qquad \text{(Expression 5)}$$

In this case, the optical axis direction having a large in-plane refraction factor is referred to as the lag axis of a optically biaxial optical phase compensation film. In FIG. 16, 13S shows the lag axis direction of the optically biaxial optical phase compensation film 13. In the case of this embodiment, 13S is parallel with the optical axis 15S of the liquid-crystal layer 15. Moreover, when simply calling the retardation of a optically biaxial medium hereafter, the retardation points in-plane retardation.

Moreover, it is assumed that the liquid-crystal-layer-side support base materials 12B and 11B of the first and second polarizers are formed of triacetylcellulose and in-plane retardation is provided to 1 nm and the thickness-directional retardation is provided to 50 nm. According to our study, the double refraction factor can be canceled by a positive c-plate having thickness-directional retardation of 50 nm. Therefore, the positive c-plate having the same characteristic is selected as the optical phase compensation member 17 set between the first substrate 16 and the liquid-crystal layer 15.

In this case, an object whose refraction factor is isotropic in a face and has a large thickness-directional refraction factor is referred to as a positive c-plate. When showing the retardation R·h by an expression in accordance with Expression 3, the following expression is obtained.

$$nz > nx \approx ny$$

$$R \cdot h = (nz - (nx+ny)/2) \cdot h \quad \text{(Expression 6)}$$

Hereafter, the retardation of the positive c-plate points the thickness-directional retardation.

Figure 17A:
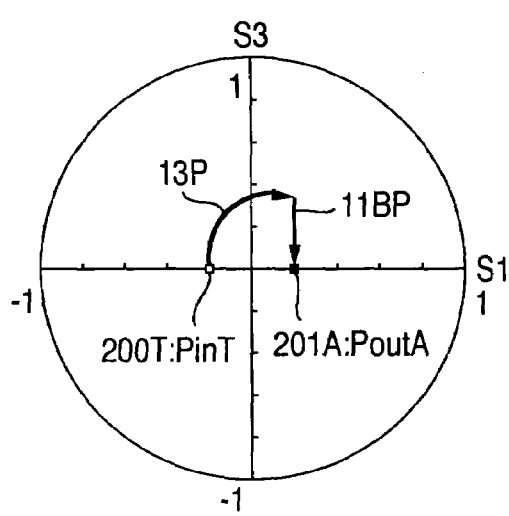
FIGS. 17A and 17B are illustrations respectively showing Poincare sphere display for explaining an embodiment of a liquid-crystal display apparatus of the present invention.
Figure 17B:
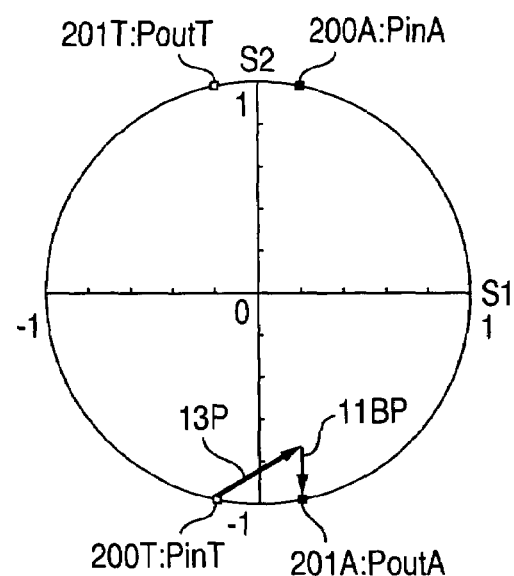

According to this configuration, the polarized state conversions shown in FIGS. 13A and 13B are realized. When showing a polarized state change on the Poincare sphere, FIGS. 17A and 17B are obtained. 13P is a polarized state change by the optically biaxial optical phase compensation film 13 and 11BP is a polarized state change by the liquid-crystal-layer-side support base material 11B of the second polarizer.

In this case, the viewing angle characteristic at the time of black display is greatly changed by the retardation of the optically biaxial optical phase compensation film 13. Therefore, it is necessary to decide the retardation in accordance with optical simulation. Because an object of the present invention is reduction of luminance change and color change, each evaluation index is introduced.

Figure 18:
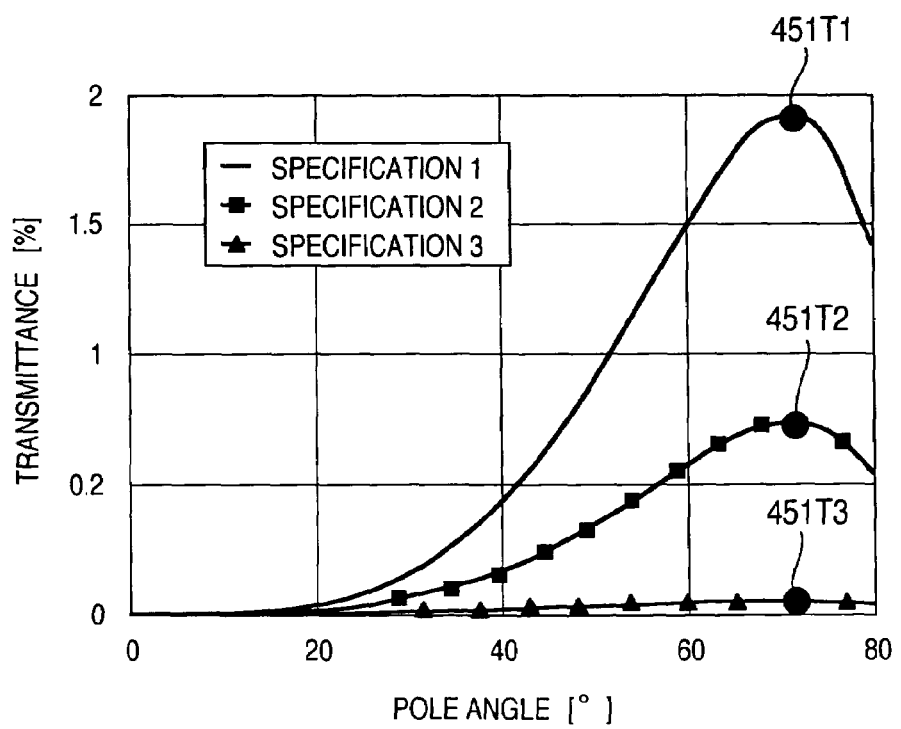
FIG. 18 is a conceptual view for explaining an optical simulation technique used for the present invention.

As the index of luminance change, the maximum transmittance for changing viewing angles is introduced. In this case, the transmittance is obtained by considering visibility at an incoming wavelength of 400 to 700 nm. This is described by referring to FIG. 18. FIG. 18 evaluates transmittance viewing angle characteristics at the time of black display in three types of liquid-crystal display apparatuses having specifications of an optical phase compensation film different from each other. This is a case of fixing azimuth angles and changing only pole angles. According to FIG. 18, specification 3 shows the most-preferable luminance change. In this case, it is found that the same result is obtained even if comparing the maximum transmittances in the specifications. 451T1, 451T2, and 451T3 are maximum transmittances in the specifications 1, 2, and 3. Thus, when the maximum transmittance is small, it can be said that a luminance change due to a viewing angle change is also small.

Figure 19:
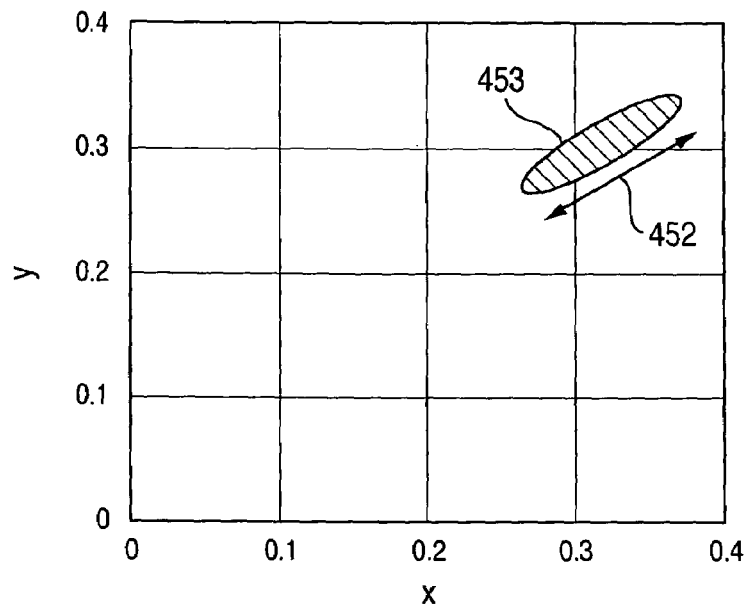
FIG. 19 is a conceptual view for explaining an optical simulation technique used for the present invention.

Then, Δxy is introduced as the index of color change. FIG. 19 shows an illustration. FIG. 19 is obtained by plotting colors at the time of black display on CIE1931xy chromaticity diagram in an optical phase compensation film specification. All chromaticity diagram viewed at all azimuth angle and all polar angle directions are plotted. As a result, the elliptic area shown in FIG. 19 is obtained. Reduction of color change due to viewing angle change corresponds to decrease of the elliptic area in FIG. 19. Therefore, the length of the major axis of the ellipsis is used as an evaluation index. This is Δxy.

Figure 20:
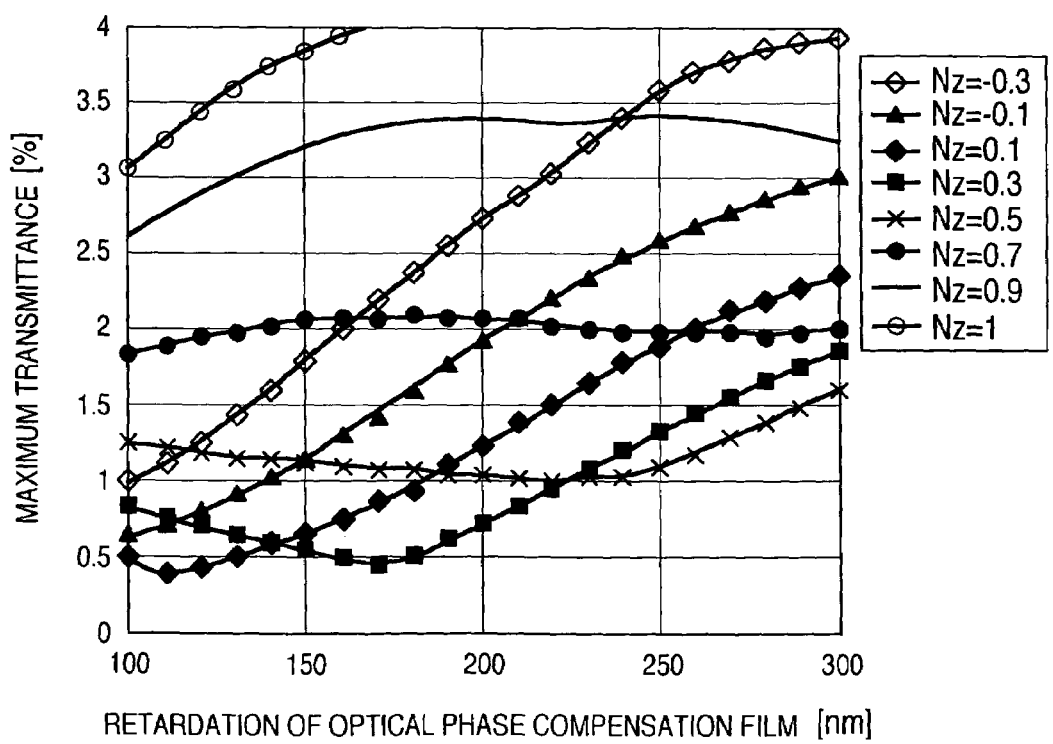
FIG. 20 is a characteristic diagram of an embodiment of a liquid-crystal display apparatus of the present invention.
Figure 21:
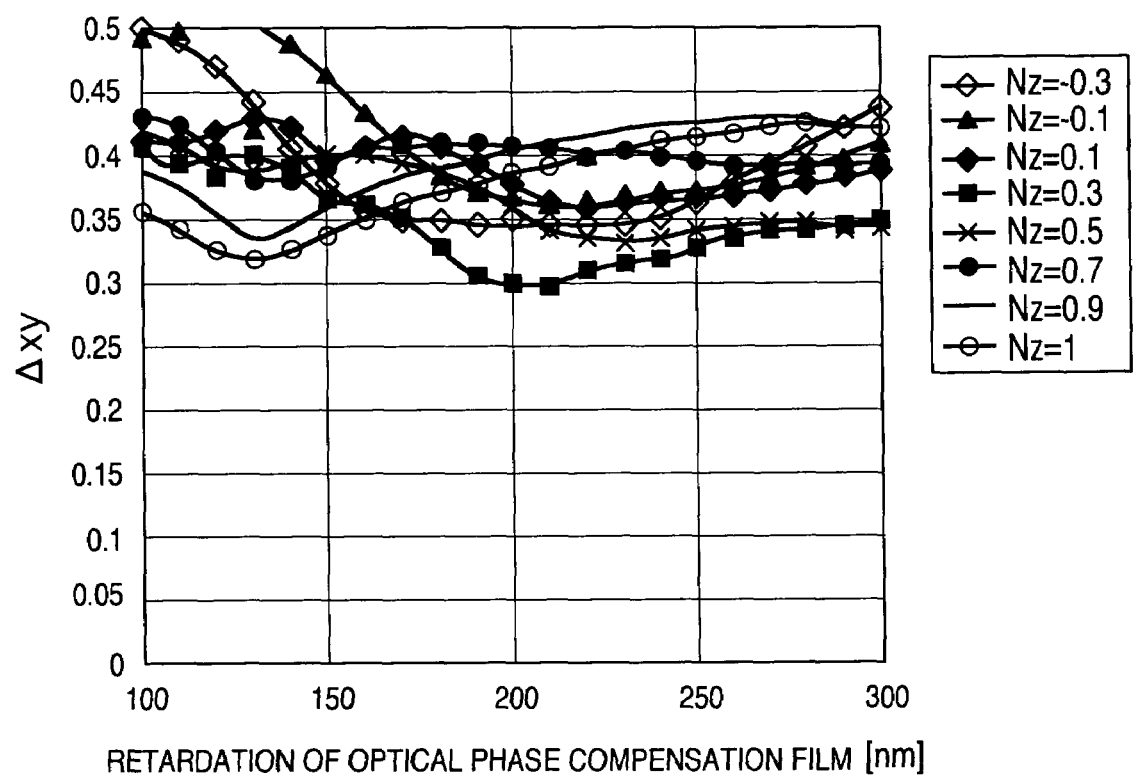
FIG. 21 is a characteristic diagram of an embodiment of a liquid-crystal display apparatus of the present invention.
Figure 22:
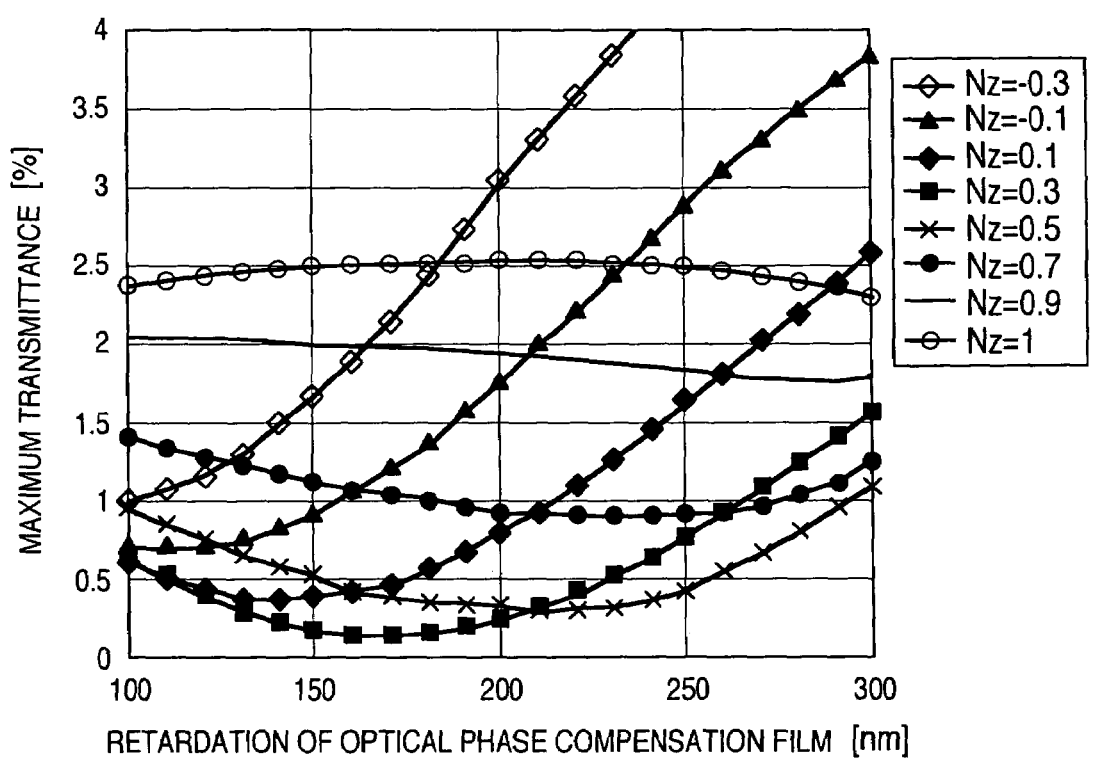
FIG. 22 is a characteristic diagram of an embodiment of a liquid-crystal display apparatus of the present invention.
Figure 23:
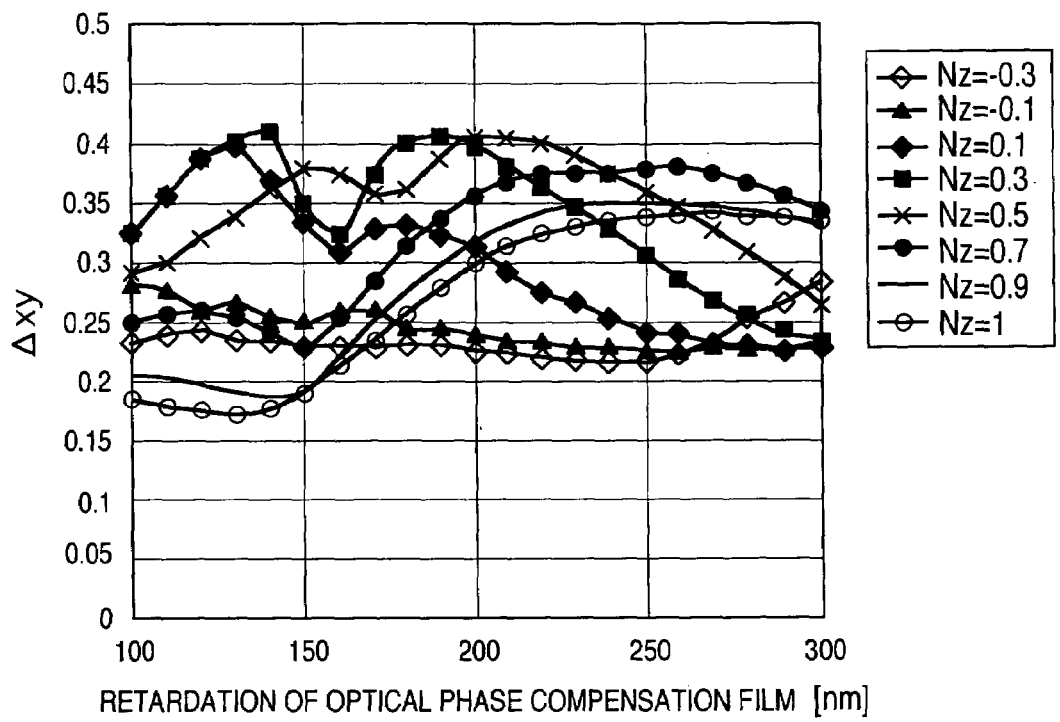
FIG. 23 is a characteristic diagram of an embodiment of a liquid-crystal display apparatus of the present invention.

First, on a case in which the optical phase compensation member 17 is not set and the double refraction factor of the support base material 12B of the first polarizer is not canceled in FIG. 16, the maximum transmittance change when changing the retardation of the optically biaxial optical phase compensation film 13 from 100 to 300 nm and Nz coefficient from −0.3 to 1 is shown in FIG. 20 and the change of Δxy is shown in FIG. 21. Then, in FIG. 16, on a case in which the optical phase compensation member 17 is provided so as to cancel the double refraction property of the support base material 12B of the first polarizer at the liquid-crystal layer side as described above, the change of the maximum transmittance and the change of Δxy are shown in FIGS. 22 and 23. When comparing FIG. 20 with FIG. 22 and FIG. 21 with FIG. 23, the visual-angle characteristic improvement effect by canceling the double refraction property of the support base material 12B of the first polarizer at the liquid-crystal layer side by the optical phase compensation member 17 can be understood. When considering that the maximum transmittance at the time of black display is approximately 2%, it can be said that the optical phase compensation film ranges shown in FIGS. 22 and 23 have preferable performance. Moreover, in the case of this embodiment, a member for completely canceling the double refraction of the polarization-plate support base material 12B is selected as the optical phase compensation member 17 in FIG. 16. However, when the difference between in-plane retardations of both and the retardations in the thickness direction is 30 nm or less, the visual-angle characteristic improvement effect is obtained when comparing a case in which the optical phase compensation member 17 is provided with a case in which the member 17 is not set.

As described above, by using the configuration in the case of o-mode shown at the left of FIG. 1 and the configuration in the case of e-mode shown at the right of FIG. 1, the trend of the visual-angle characteristic change at the time of black display for the retardation of the optical phase compensation film 13 obtained here is almost the same.

Embodiment 2

FIG. 1 shows a structure of this embodiment and FIG. 16 shows an optical configuration of o-mode. This embodiment uses one optically biaxial optical phase compensation film whose Nz coefficient ranges between 0 and 1 (both excluded) as the optical phase compensation member 13. In FIG. 16, 13S shows the lag axis direction of the optically biaxial optical phase compensation film 13. In the case of this embodiment, 13S is parallel with the optical axis 15S of the liquid-crystal layer 15.

Figure 24A:
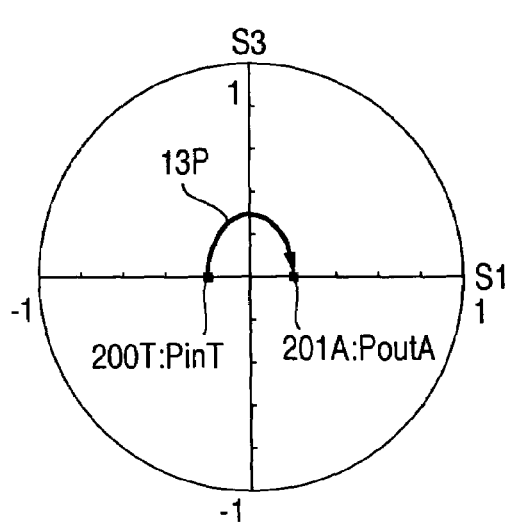
FIGS. 24A and 24B are illustrations respectively showing Poincare sphere display for explaining a liquid-crystal display apparatus of the present invention.
Figure 24B:
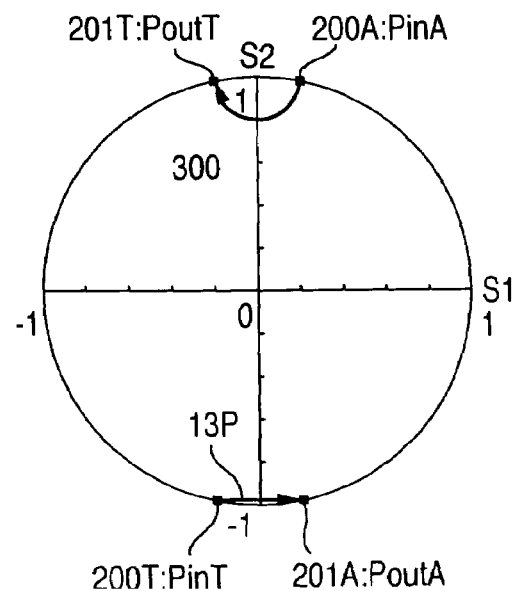
Figure 25:
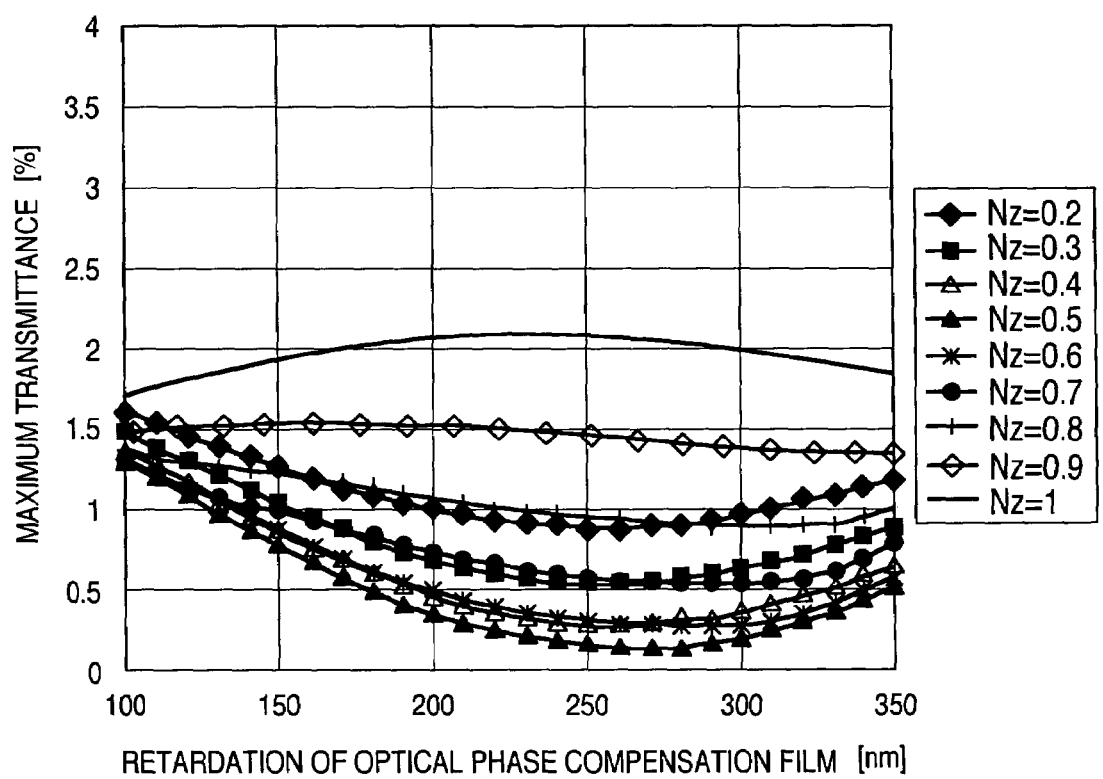
FIG. 25 is a characteristic diagram of an embodiment of the present invention.
Figure 26:
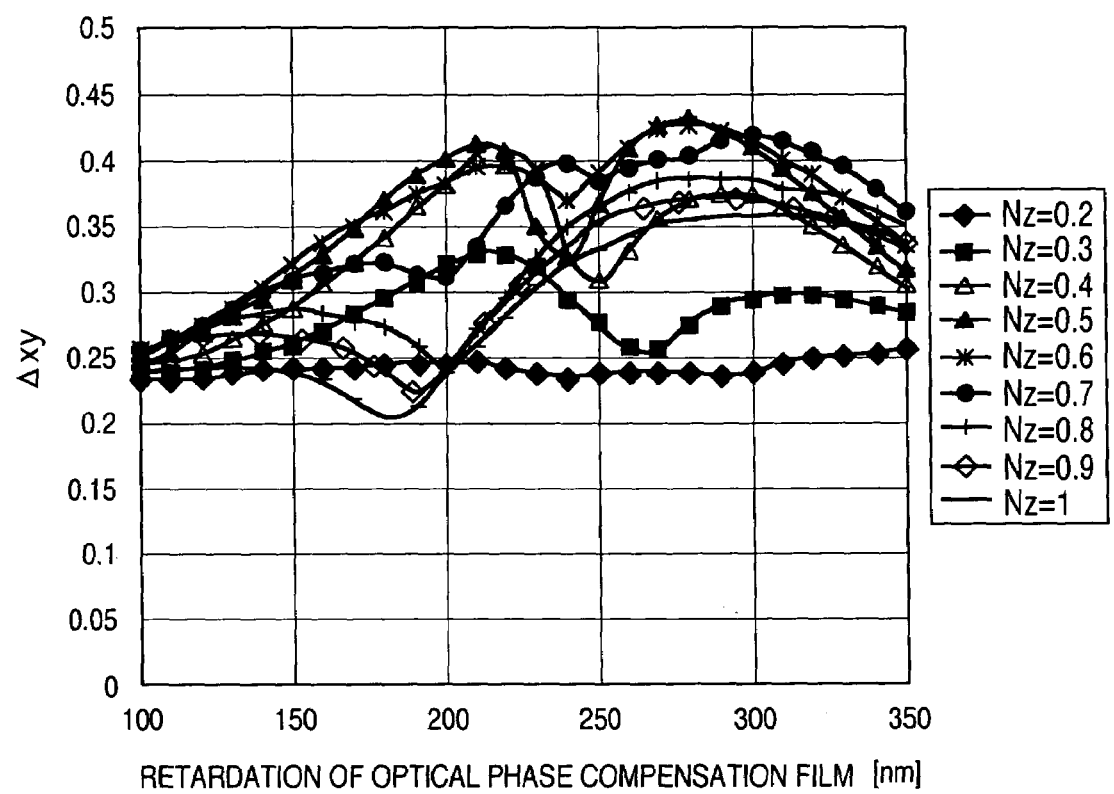
FIG. 26 is a characteristic diagram of an embodiment of the present invention.

Moreover, the liquid-crystal-layer-side support base material 12B of the first polarizer is formed of triacetylcellulose and it is assumed that the in-plane retardation is 1 nm and the thickness-directional retardation is 50 nm. Therefore, the positive c-plate having retardation of 50 nm is selected as the optical phase compensation member 17 between the first substrate 16 and the liquid-crystal layer 15 similarly to the case of the embodiment 1. Moreover, in the case of this embodiment, it is assumed that the liquid-crystal-layer-side support base material 11B of the second polarizer is so small that it can be ignored. According to this configuration, the polarized state conversions shown in FIGS. 13A and 13B are realized. FIGS. 24A and 24B show polarized state changes on the Poincare sphere. 13P is a polarized state change by the optically biaxial optical phase compensation film 13. FIGS. 25 and 26 show changes of the maximum transmittance and Δxy for the retardation and Nz coefficient of an optical phase compensation film. When comparing FIG. 20 with FIG. 25 and FIG. 21 with FIG. 26, it can be understood that a preferable viewing angle characteristic can be obtained from this embodiment.

This embodiment uses the configuration at the left of FIG. 1. However, when the optical configuration in FIG. 16 is satisfied, almost the same result is obtained. That is, it is allowed that the optical phase compensation film 13 is provided between the liquid-crystal layer 15 and the second substrate 14. Moreover, because the support base material 11B of the second polarizer at the liquid-crystal layer side is almost isotropic, it is possible to consider the case almost equivalent with the case in which support base material 11B is not present in the optical configuration in FIG. 16. That is, it is allowed that the optical phase compensation film 13 of this embodiment directly becomes the polarization-plate support base material 11B.

Moreover, in FIG. 16, the lag axis 13S of the optical phase compensation film 13 is parallel with the optical axis 15S of the liquid-crystal layer 15. However, in the case of the configuration of this embodiment, almost the same result is obtained even if 13S is vertical to 15S. The above mentioned is also applied to e-mode.

Embodiment 3

Figure 27:
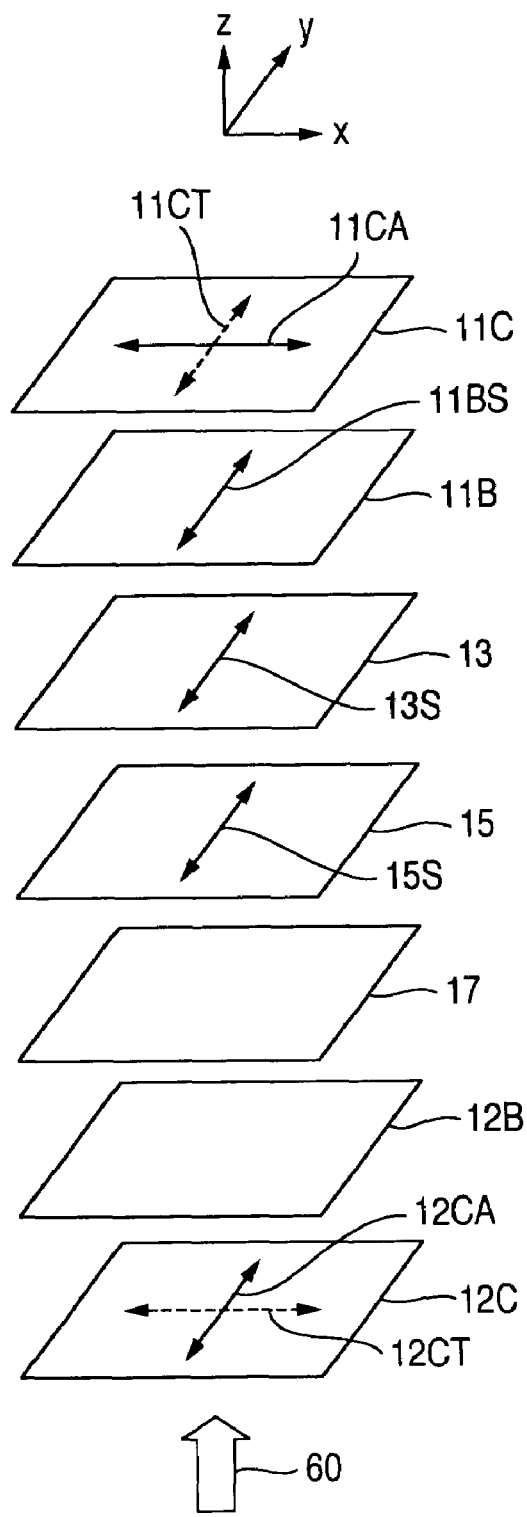
FIG. 27 is a block diagram showing an embodiment of the present invention.

The structure of this embodiment is shown in FIG. 1 and the optical configuration of o-mode is shown in FIG. 27. This embodiment uses one optical phase compensation film whose Nz coefficient is smaller than 0.5 as the optical phase compensation member 13 in FIG. 1. Moreover, a medium showing a double refraction in which Nz coefficient is larger than 0.5 is used as the liquid-crystal-layer-side support base material 11B of the second polarizer. In FIG. 27, 13 denotes an optical phase compensation film having an Nz coefficient smaller than 0.5 and 13S denotes the lag axis direction of the optical phase compensation film. Furthermore, 11B denotes the liquid-crystal-layer-side support base material of the second polarizer and has an Nz coefficient larger than 0.5 and 11BS denotes the lag axis direction. Each lag axis direction is provided in parallel with the lag axis direction 15S of the liquid-crystal layer 15. Furthermore, it is assumed that the liquid-crystal-layer-side support base material 12B of the first polarizer is formed of triacetylcellulose, the in-plane retardation is 1 nm, and thickness-directional retardation is 50 nm. Thus, similarly to the case of the embodiment 1, the positive c-plate having retardation of 50 nm is selected as the optical phase compensation member 17 set between the first substrate 16 and the liquid-crystal layer 15.

Figure 28A:
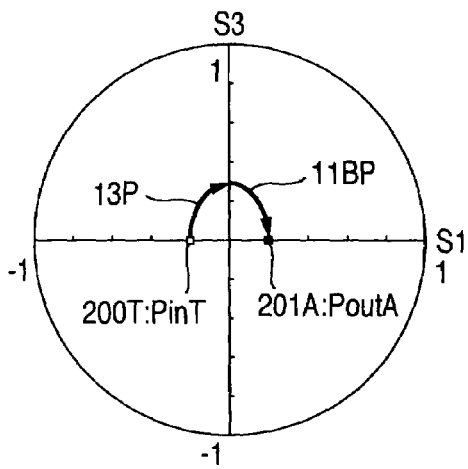
FIGS. 28A and 28B are illustrations respectively showing Poincare sphere display for explaining an embodiment of the present invention.
Figure 28B:
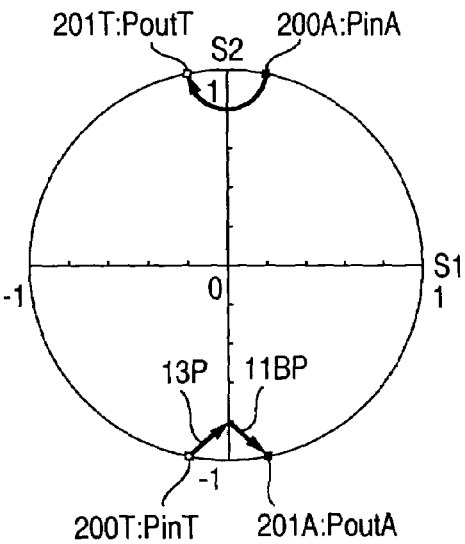

According to this configuration, the polarized state conversions shown in FIGS. 13A and 13B are realized. FIG. 28 shows a polarized state change on the Poincare sphere. 13P denotes a polarized state change by the optical phase compensation film 13 and 11BP denotes a polarized state change by the liquid-crystal-layer-side support base material 11B of the second polarizer. According to our study, when conditions in which the optical phase compensation member 13 has a double refraction property of an Nz coefficient is smaller than 0.5 and the liquid-crystal-layer-side support base material 11B of the second polarizer has an Nz coefficient larger than 0.5 are satisfied, the polarized state changes shown in FIGS. 28A and 28B occur. It can be understood from FIGS. 28A and 28B that the optimum retardation depends on a combination of both Nz coefficients. According to our study, it is found that both optimum retardations are included in a range between 20 and 200 nm.

Figure 29:
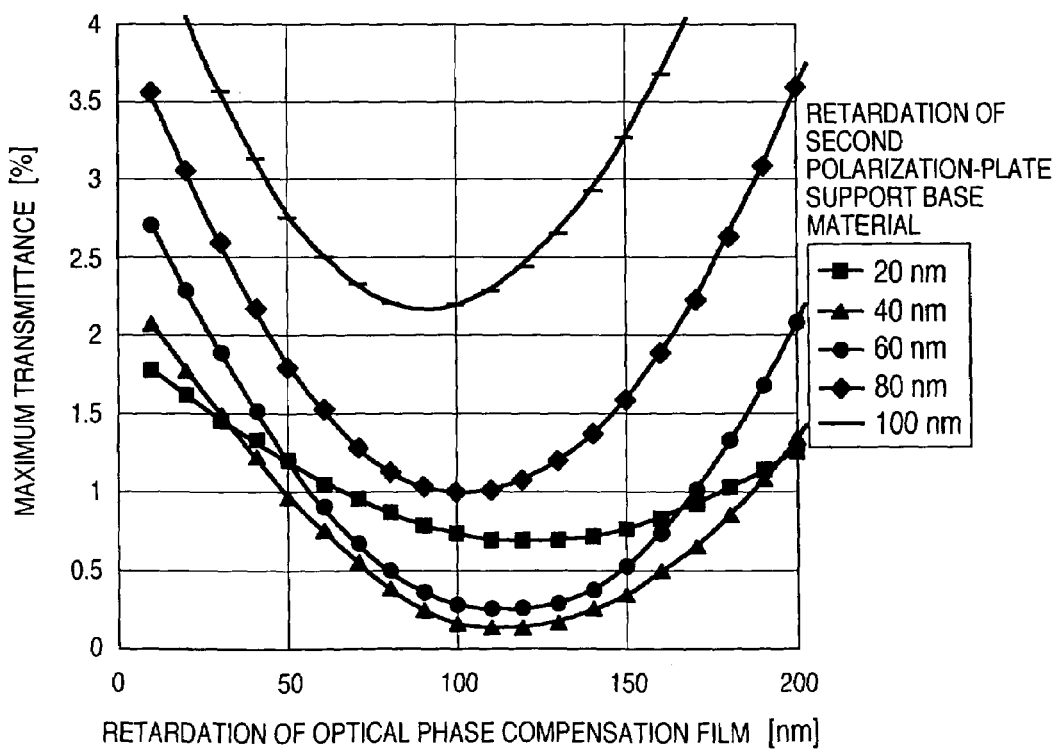
FIG. 29 is a characteristic diagram of an embodiment of the present invention.
Figure 30:
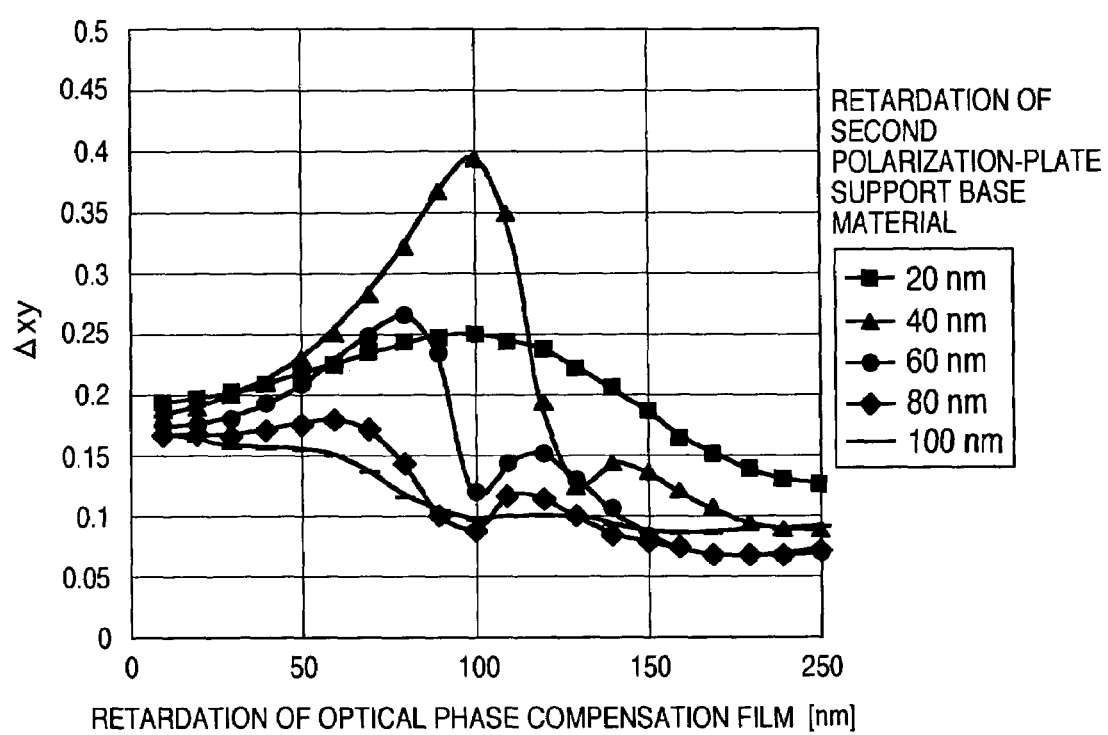
FIG. 30 is a characteristic diagram of an embodiment of the present invention.

As an example, FIGS. 29 and 30 show the maximum transmittance and retardation dependency of Δxy when setting the optical phase compensation member 13 to Nz=−1 and the liquid-crystal-layer-side support base material 11B of the second polarizer to Nz=1 in FIG. 27. It can be understood that a preferable viewing angle characteristic can be obtained in the above retardation range.

In the case of this embodiment, as shown in FIG. 27, the lag axes 13S and 11BS of the optical phase compensation film 13 and polarization-plate support base material 11B are parallel with the optical axis 15S of the liquid-crystal layer. However, according to our study, even if the lag axes 13S and 11BS are orthogonal to the optical axis 15S of the liquid-crystal layer, polarized state changes equivalent with those in FIGS. 28A and 28B are realized. In this case, however, it is necessary that the optical phase compensation film 13 has an Nz coefficient larger than 0.5 and the polarization-plate support base material 11B has an Nz coefficient smaller than 0.5. In the case of e-mode, these relations are reversed as described above.

Moreover, in the case of this embodiment, the polarized state conversions in FIGS. 28A and 28B are realized by double refraction properties of the optical phase compensation film 13 and second polarization-plate support base material 11B. However, it is also allowed to realize it by two optical phase compensation films. When the second-polarization-plate support base material 11B is almost optical isotropic, it is allowed to optically consider the above case completely same as the case of this embodiment. Moreover, because the double refraction property of a polarization-plate support base material is generally small, when eliminating the influence of the double refraction property of a liquid-crystal layer at a diagonal viewing angle, the characteristic to be satisfied by the optical phase compensation member 13 in FIG. 1 is almost the same.

Embodiment 4

Figure 31:
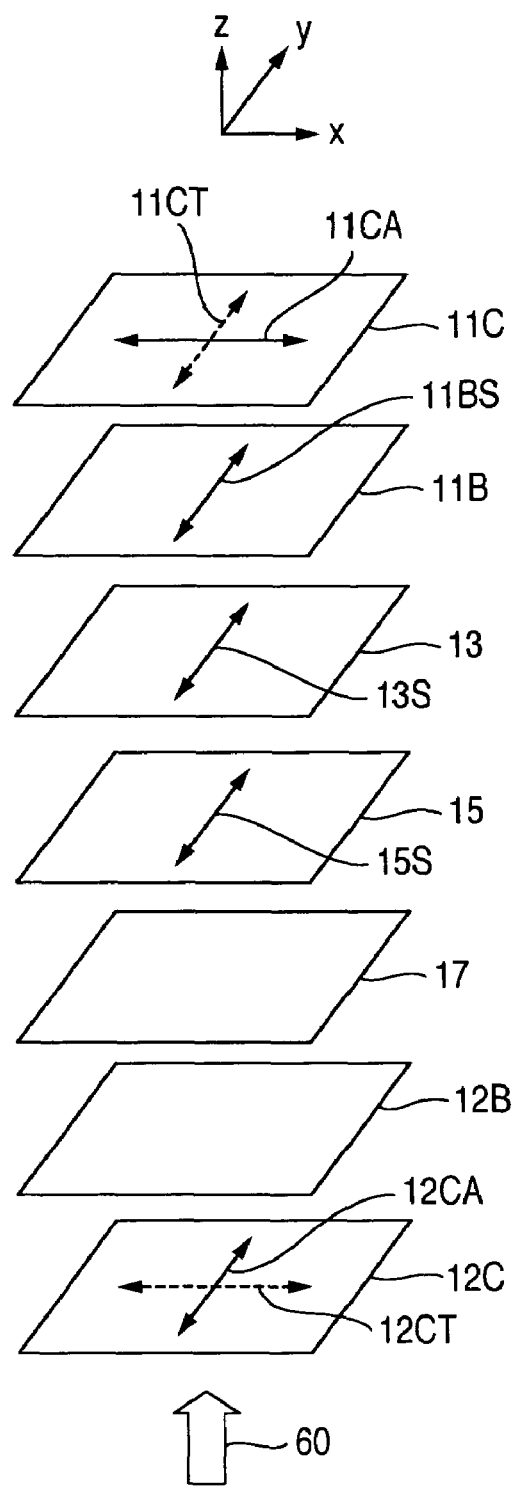
FIG. 31 is a block diagram showing an embodiment of the present invention.

The structure of this embodiment is shown in FIG. 1 and the optical configuration of o-mode is shown in FIG. 31. This embodiment uses one optical phase compensation film having an Nz coefficient of 0.75 as the optical phase compensation member 13 in FIG. 1. Moreover, a medium showing a double refraction property having an Nz coefficient of 0.25 as the liquid-crystal-layer-side support base material 11B of the second polarizer. In FIG. 31, reference numeral 13 denotes an optical phase compensation film having an Nz coefficient of 0.75 and 13S denotes is the lag axis direction of the optical phase compensation film. Moreover, 11B denotes the liquid-crystal-layer-side support base material of the second polarizer having an Nz coefficient of 0.25 and 11BS denotes the lag axis direction. Each lag axis direction is provided in parallel with the lag axis direction 15S of the liquid-crystal layer 15. Moreover, it is assumed that the liquid-crystal-layer-side support base material 12B of the first polarizer is formed of triacetylcellulose, in-plane retardation is 1 nm, and thickness-directional retardation is 50 nm. Therefore, similarly to the case of the embodiment 1, the positive c-plate having retardation of 50 nm is selected as the optical phase compensation member 17 set between the first substrate 16 and the liquid-crystal layer 15.

According to this configuration, the polarized state conversions shown in FIGS. 13A and 13B are realized. FIGS. 32A and 32B show polarized state changes on the Poincare sphere. 13P denotes a polarized state change by the optical phase compensation film 13 and 11BP denotes a polarized state change by the liquid-crystal-layer-side support base material 11B of the second polarizer. According to our study, when conditions that the optical phase compensation member 13 has double refraction property of 0.6<Nz<0.9 and the liquid-crystal-layer-side support base material 11B of the second polarizer has double refraction property of 0.1<Nz<0.4 are satisfied, polarized state changes shown in FIGS. 32A and 32B occur. It can be understood from FIGS. 32A and 32B that optimum retardations of both are close to 270 nm.

Figure 34:
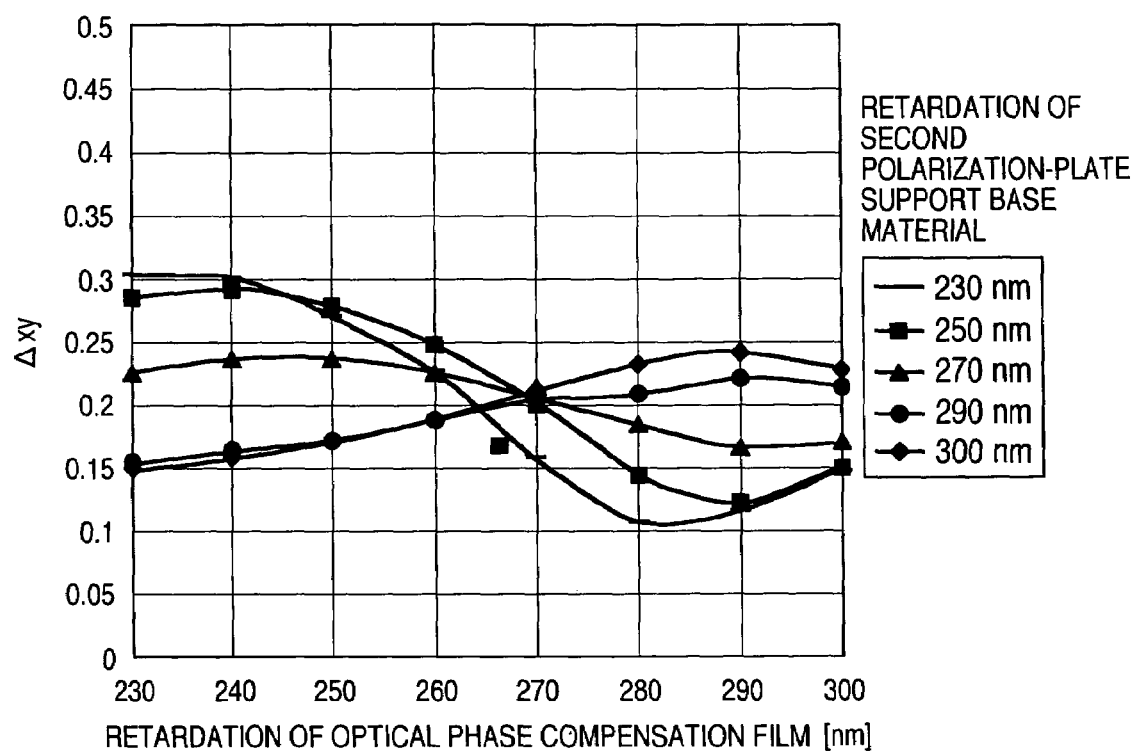
FIG. 34 is a characteristic diagram of an embodiment of the present invention.

FIGS. 33 and 34 show the relation between retardations, maximum transmittances, and Δxy of the optical phase compensation film 13 and second polarization-plate support base material 11B. It can be understood that a preferable visual-angle characteristic can be obtained nearby the retardation of 270 nm.

In the case of this embodiment, as shown in FIG. 31, the lag axes 13S and 11BS of the optical phase compensation film 13 and second-polarization-plate support base material 11B are parallel with the optical axis 15S of the liquid-crystal layer.

However, according to our study, even if the lag axes 13S and 11BS are orthogonal to the optical axis 15S of the liquid-crystal layer, polarized state changes equivalent with the case of FIGS. 32A and 32B are realized. In this case, however, it is necessary that the optical phase compensation film 13 has an Nz coefficient of approximately 0.25 and the polarization-plate support base material 11B has an Nz coefficient of approximately 0.75. In the case of e-mode, these relations are reversed as described above.

Moreover, in the case of this embodiment, the polarized state conversions in FIGS. 32A and 32B are realized by birefringence of the optical phase compensation film 13 and second-polarization-plate support base material 11B. However, it is allowed to realize the polarized sate conversion by two optical phase compensation films. When the second-polarization-plate support base material 11B is almost optically isotropic, it is allowed to optically consider it completely the same as the case of this embodiment. Moreover, because the double refraction property of a polarization-plate support base material is generally small, when eliminating the influence of the double refraction property of a liquid-crystal layer at the diagonal viewing angle like the case of this embodiment, a characteristic to be satisfied by the optical phase compensation member 13 in FIG. 1 is almost the same.

Embodiment 5

Figure 35:
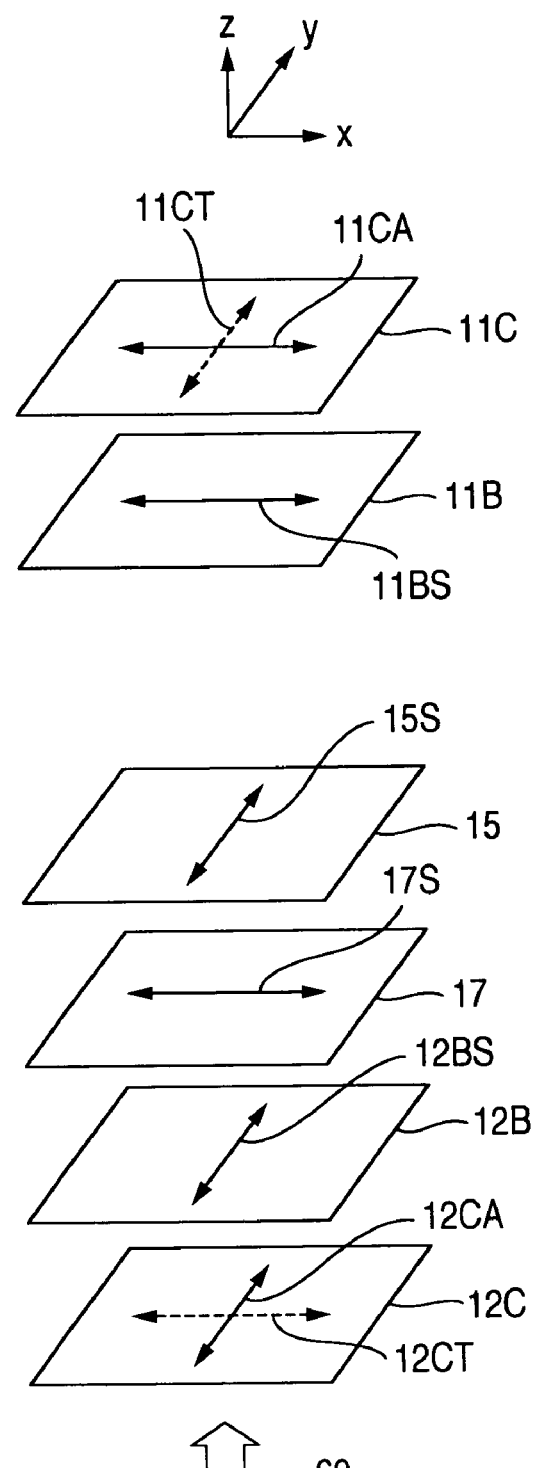
FIG. 35 is a block diagram showing an embodiment of the present invention.

The structure of this embodiment is shown at the left of FIG. 2 and the optical configuration is shown in FIG. 35. This embodiment is kept in o-mode, the liquid-crystal-layer-side support base materials 12B and 11B of the first and second polarizers respectively have double refraction property same as a negative a-plate and retardations of both are equal to each other. Moreover, the optical phase compensation member 17 having double refraction property same as a positive a-plate is provided between the first substrate 16 and the liquid-crystal layer 15 and an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA and the lag axis 11BS of the liquid-crystal-layer-side support base material 11B of the second polarizer is vertical to the first polarization-plate absorption axis 12CA, and the lag axis 17S of the optical phase compensation member 17 is vertical to the first polarization-plate absorption axis 12CA.

In this case, a plate which has refraction factor anisotropy in the face and whose thickness-directional refraction factor is almost equal to that of a plate having a large in-plane refraction factor is referred to as negative a-plate. When showing retardation by an expression in accordance with Expression 4, the following expressions are obtained. Hereafter, it is assumed that the retardation of negative a-plate points the following in-plane retardation.

$ny \approx nz > nx$ $\Delta n \cdot dr = (ny - nx) \cdot dr$ (Expression 7)

The negative a-plate includes two main axes respectively having a large refraction factor. When hereafter describing the lag axis of the negative a-plate, it is assumed that lag axis points a direction in which an in-plane refraction factor is large (direction of ny in Expression 7).

According to this configuration, the polarized state conversions shown in FIGS. 13A and 13B are realized. FIGS. 36A and 36B show polarized state changes on the Poincare sphere. 12BP denotes a polarized state change by the liquid-crystal-layer-side support base material 12B of the first polarizer, 17P denotes a polarized state change by the optical phase compensation member 17 set between the first substrate 16 and the liquid-crystal layer 15, 15P denotes a polarized state change by the liquid-crystal layer 15, and 11BP denotes a polarized state change by the liquid-crystal-layer-side support base material 11B of the second polarizer. These polarized state changes are mutually canceled and the polarized state conversions equivalent with the case of FIGS. 13A and 13B are substantially realized. Moreover, according to our study, it is not always necessary that a polarization-plate support material is the negative a-plate. When the relation of $-0.3 < Nz < 0.3$ is satisfied, advantages of the present invention are obtained. Similarly, it is not always necessary that the optical phase compensation member 17 is the positive a-plate. When the relation of $0.7 < Nz < 1.3$ is satisfied, advantages of the present invention are obtained.

When assuming that retardations of the polarization-plate support base materials 12B and 11B as 260 nm and the retardation of the optical phase compensation member 17 as 170 nm, the maximum transmittance becomes 0.0821% and $\Delta xy$ becomes 0.133. It can be understood that a preferable viewing angle characteristic is obtained from the above configuration.

As shown in FIGS. 36A and 36B, the optimum retardation of a polarization-plate support base material or optical phase compensation member depends on the retardation of a liquid-crystal layer or the wavelength dispersion of each optical member.

This embodiment uses the configuration shown in FIG. 2 in order to realize polarized state conversion by a simple configuration. However, even a configuration in which an optical phase compensation member is provided between a polarizer support base material and a substrate can also realize a polarized state change same as that described for this embodiment.

Embodiment 6

The structure of this embodiment is shown at the left of FIG. 2 and the optical configuration is shown in FIG. 35. This embodiment is o-mode, the liquid-crystal-layer-side support base materials 12B and 11B of the first and second polarizers have the same double refraction property as the negative a-plate, and retardations of both are almost equal to each other. Moreover, the optical phase compensation member 17 having the same double refraction property as the negative a-plate is provided between the first substrate 16 and the liquid-crystal layer 15 but an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA, the lag axis 11BS of the liquid-crystal-layer-side support base material 11B of the second polarizer is vertical to the first polarization-plate absorption axis 12CA, and the lag axis 17S of the optical phase compensation member 17 is vertical to the first polarization-plate absorption axis 12CA.

The polarized state conversions shown in FIGS. 13A and 13B are realized by the above configuration. FIG. 37 shows a polarized state change on the Poincare sphere. 12BP denotes a polarized state change by the liquid-crystal-layer-side support base material 12B of the first polarizer, 17P denotes a polarized state change by the optical phase compensation member 17 set between the first substrate 16 and the liquid-crystal layer 15, 15P denotes a polarized state change by the liquid-crystal layer 15, and 11BP denotes a polarized state change by the liquid-crystal-layer-side support base material 11B of the second polarizer. These polarized state changes are mutually canceled and the polarized state conversions same as those in FIGS. 13A and 13B are substantially realized. Moreover, according to our study, it is not always necessary that a polarization-plate support base material is the negative a-plate. When the relation of –0.3<Nz<0.3 is satisfied, advantages of the present invention are obtained. Similarly, it is not always necessary that the optical phase compensation member 17 is the negative a-plate. When the relation of –0.3<Nz<0.3 is satisfied, advantages of the present invention are obtained.

As being understood by comparing FIGS. 36A and 36B with FIGS. 37A and 37B, a polarized state change performed in this embodiment is essentially equivalent with the case of the embodiment 5. Therefore, it can be understood that a preferable viewing angle characteristic can be obtained.

As shown in FIG. 37, the optimum retardation of a polarization-plate support base material or optical phase compensation member depends on the retardation of a liquid-crystal layer or wavelength dispersion of each optical member.

Though this embodiment uses the configuration shown in FIG. 2 in order to realize polarized state conversion by a simple configuration, a polarized state change same as that described for this embodiment is realized in a configuration in which an optical phase compensation member is provided between a polarization-plate support base material and a substrate.

Embodiment 7

The structure of this embodiment is shown at the right of FIG. 2 and the optical configuration is shown in FIG. 38. This embodiment is o-mode, the liquid-crystal-layer-side support base materials 12B and 11B of the first and second polarizers respectively have double refraction property same as the negative a-plate and retardations of both are almost equal to each other. Moreover, the optical phase compensation member 17 having double refraction property same as the negative a-plate is provided between the liquid-crystal layer 15 and the second substrate 14 but an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA, the lag axis 11BS of the liquid-crystal-layer-side support base material 11B of the second polarizer is vertical to the first polarization-plate absorption axis 12CA, and the lag axis 17S of the optical phase compensation member 17 is vertical to the first polarization-plate absorption axis 12CA.

According to the above configuration, the polarized state conversions shown in FIGS. 13A and 13B are realized. FIG. 39 shows a polarized state change on the Poincare sphere. 12BP denotes a polarized state change by the liquid-crystal-layer-side support base material 12B of the first polarizer, 17P denotes a polarized state change by the optical phase compensation member 17 set between the liquid-crystal layer 15 and the second substrate 14, 15P denotes a polarized state change by the liquid-crystal layer 15, and 11BP denotes a polarized state change by the liquid-crystal-layer-side support base material 11B of the second polarizer. These polarized state changes are mutually canceled and the polarized state conversions same as those in FIGS. 13A and 13B are realized. Moreover, according to our study, it is not always necessary that a polarization-plate support base material is the negative a-plate. When the relation of –03<Nz<0.3 is satisfied, advantages of the present invention can be obtained. Similarly, it is not always necessary that the optical phase compensation member 17 is the negative a-plate. When the relation of –0.3<Nz<0.3 is satisfied, advantages of the present invention can be obtained.

Figure 39A:
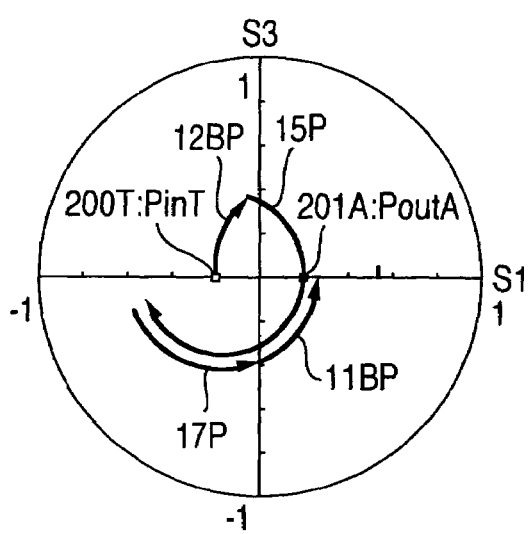
FIGS. 39A and 39B are illustrations respectively showing Poincare sphere display for explaining an embodiment of a liquid-crystal display apparatus of the present invention.
Figure 39B:
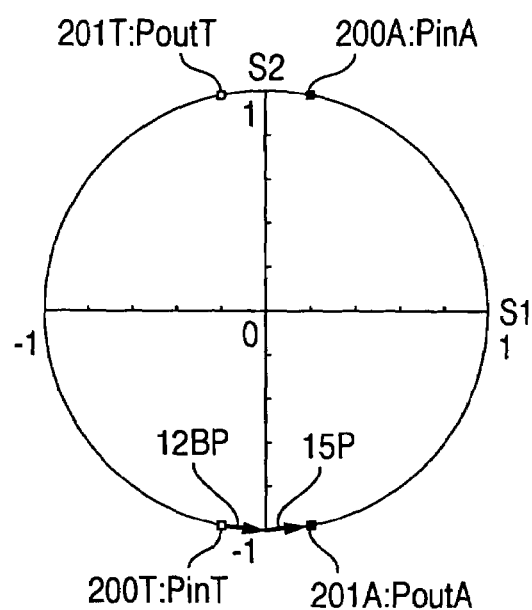

As being understood by comparing FIGS. 36A and 36B with FIGS. 39A and 39B, polarized state conversion performed in this embodiment is essentially equivalent with the case of the embodiment 5. Therefore, it can be understood that a preferable visual-angle characteristic is obtained.

As shown in FIG. 39, the optimum retardation of a polarization-plate support base material or optical phase compensation member depends on the retardation of a liquid-crystal layer and wavelength dispersion of each optical member.

This embodiment uses the configuration shown in FIG. 2 in order to realize polarized state conversion by a simple configuration. However, a configuration in which an optical phase compensation member is provided between a polarization-plate support base material and a substrate can realize a polarized state change same as that described for this embodiment.

Embodiment 8

The structure of this embodiment is shown at the left of FIG. 2 and the optical configuration is shown in FIG. 40. This embodiment is e-mode, the liquid-crystal-layer-side support base materials 12B and 11B of the first and second polarizers respectively have double refraction property same as that of the negative a-plate, and retardations of both are almost equal to each other. Moreover, the optical phase compensation member 17 having double refraction property same as that of the negative a-plate is provided between the first substrate 16 and the liquid-crystal layer 15 but an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA, the lag axis 11BS of the liquid-crystal-layer-side support base material 11B of the second polarizer is vertical to the first polarization-plate absorption axis 12CA, and the lag axis 17S of the optical phase compensation member 17 is vertical to the first polarization-plate absorption axis 12CA.

According to the above configuration, the polarized state conversions shown in FIGS. 14A and 14B are realized. FIG. 41 shows a polarized state change on the Poincare sphere. 12BP denotes a polarized state change by the liquid-crystal-layer-side support base material 12B of the first polarizer, 17P denotes a polarized state change by the optical phase compensation member 17 set between the first substrate 16 and the liquid-crystal layer 15, 15P denotes a polarized state change by the liquid-crystal layer 15, and 11BP denotes a polarized state change by the liquid-crystal-layer-side support base material 11B of the second polarizer. These polarized state changes are mutually canceled and the polarize state conversions same as the case of FIGS. 14A and 14B are realized. Moreover, according to our study, it is not always necessary that a polarization-plate support base material is the negative a-plate. When the relation of −0.3<Nz<0.3 is satisfied, advantages of the present invention are obtained. Similarly, it is not always necessary that the optical phase compensation member 17 is the negative a-plate. When the relation of −0.3<Nz<0.3 is satisfied, advantages of the present invention are obtained.

Figure 41A:
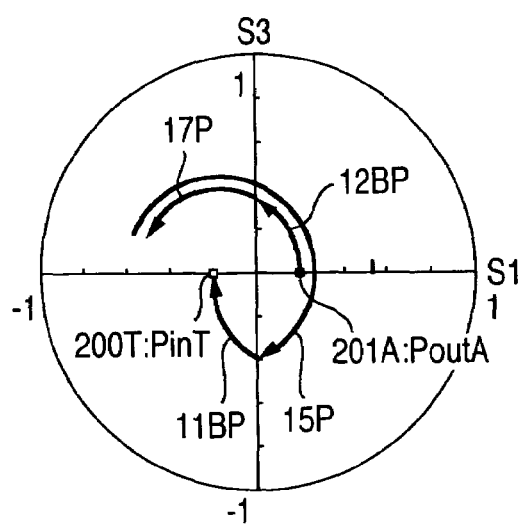
FIGS. 41A and 41B are illustrations respectively showing Poincare sphere display for explaining an embodiment of a liquid-crystal display apparatus of the present invention.
Figure 41B:
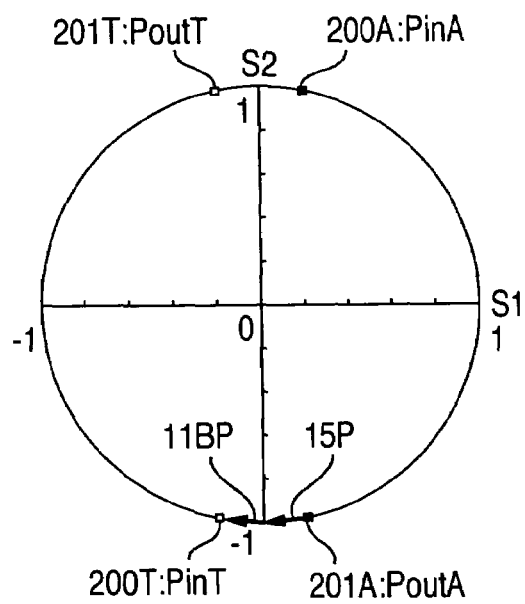

As being understood by comparing FIGS. 36A and 36B with FIGS. 41A and 41B, a polarized state conversion performed in this embodiment is essentially equivalent with the case of the embodiment 5. Therefore, it can be understood that a preferable visual-angle characteristic can be obtained.

As shown in FIG. 41, the optimum retardation of a polarization-plate support base material or optical phase compensation member depends on the retardation of a liquid-crystal layer or wavelength dispersion of each optical member.

This embodiment uses the configuration shown in FIG. 2 in order to realize polarized state conversion by a simple configuration. However, a configuration in which an optical phase compensation member is provided between a polarization-plate support base material and a substrate can realize a polarized state change same as that described for this embodiment.

Embodiment 9

The structure of this embodiment is shown at the right of FIG. 2 and the optical configuration is shown in FIG. 42. This embodiment is e-mode, the liquid-crystal-layer-side support base materials 12B and 11B of the first and second polarizers respectively have double refraction property same as that of the negative a-plate, and retardations of both are almost equal to each other. Moreover, the optical phase compensation member 17 having double refraction property same as the case of the positive a-plate is provided between the liquid-crystal layer 15 and the second substrate 14 but an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA, the lag axis 11BS of the liquid-crystal-layer-side support base material 11B of the second polarizer is vertical to the first polarization-plate absorption axis 12CA, and the lag axis 17S of the optical phase compensation member 17 is parallel with the first polarization-plate absorption axis 12CA.

According to the above configuration, the polarized state conversions shown in FIGS. 14A and 14B are realized. FIG. 43 shows a polarized state change on the Poincare sphere. 12BP denotes a polarized state change by the liquid-crystal-layer-side support base material 12B of the first polarizer, 17P denotes a polarized state change by the optical phase compensation member 17 set between the liquid-crystal layer 15 and the second substrate 14, 15P denotes a polarized state change by the liquid-crystal layer 15, and 11BP denotes a polarized state change by the liquid-crystal-layer-side support base material 11B of the second polarizer. These polarized state changes are mutually canceled and polarized state conversions same as the case of FIGS. 14A and 14B are substantially realized. Moreover, according to our study, it is not always necessary that a polarization-plate support member is the negative a-plate. When the relation of −0.3<Nz<0.3 is satisfied, advantages of the present invention are obtained.

Similarly, it is not always necessary that the optical phase compensation member 17 is the positive a-plate. When the relation of 0.7<Nz<1 is satisfied, advantages of the present invention are obtained.

As being understood by comparing FIGS. 36A and 36B with FIGS. 43A and 43B, a polarized state change performed in this embodiment is essentially equivalent to the case of the embodiment 5. Therefore, it can be understood that a preferable visual-angle characteristic is obtained.

As shown in FIGS. 43A and 43B, the optimum retardation of a polarization-plate support base material or optical phase compensation member depends on the retardation of a liquid-crystal layer or wavelength dispersion of each optical member.

This embodiment uses the configuration shown in FIG. 2 in order to realize polarized state conversion by a simple configuration. However, a configuration in which an optical phase compensation member is provided between a polarization-plate support base material and a substrate can perform polarized state change same as that described for this embodiment.

Embodiment 10

The structure of this embodiment is shown at the right of FIG. 2 and the optical configuration is shown in FIG. 42. This embodiment is e-mode, the liquid-crystal-layer-side support base materials 12B and 11B of the first and second polarizers respectively have double refraction property same as the case of the negative a-plate, and retardations of both are almost equal to each other. Moreover, the optical phase compensation member 17 having double refraction property same as the case of the negative a-plate between the liquid-crystal layer 15 and the second substrate 14 but an optical member having double refraction property is not set between the liquid-crystal-layer-side support base material 12B of the first polarizer and the first substrate 16 or between the second substrate 14 and the liquid-crystal-layer-side support base material 11B of the second polarizer. Moreover, the lag axis 12BS of the liquid-crystal-layer-side support base material 12B of the first polarizer is parallel with the first polarization-plate absorption axis 12CA, the lag axis 11BS of the liquid-crystal-layer-side support base material 11B of the second polarizer is vertical to the first polarization-plate absorption axis 12CA, and the lag axis 17S of the optical phase compensation member 17 is parallel with the first polarization-plate absorption axis 12CA.

According to the above configuration, polarized state conversions shown in FIGS. 14A and 14B are realized. FIG. 44 shows a polarized state change on the Poincare sphere. 12BP denotes a polarized state change by the liquid-crystal-layer-side support base material 12B of the first polarizer, 17P denotes a polarized state change by the optical phase compensation member 17 set between the liquid-crystal layer 15 and the second substrate 14, 15P denotes a polarized state change by the liquid-crystal layer 15, and 11BP denotes a polarized state change by the liquid-crystal-layer-side support base material 11B of the second polarizer. These polarized state changes are mutually canceled and polarized state conversions same as the case of FIGS. 14 A and 14B are substantially realized. Moreover, according to our study, it is not always necessary that a polarization-plate support base material is the negative a-plate. When the relation of −0.3<Nz<0.3 is satisfied, advantages of the present invention are obtained. Similarly, it is not always necessary that the optical phase compensation member 17 is the negative a-plate. When the relation of −0.3<Nz<0.3 is satisfied, advantages of the present invention are obtained.

As being understood by comparing FIGS. 36A and 36B with FIGS. 44A and 44B, polarized state conversion realized in this embodiment is essentially equivalent with the case of the embodiment 5. Therefore, it can be understood that a preferable visual-angle characteristic is obtained.

As shown in FIG. 44, the optimum retardation of a polarization-plate support base material or optical phase compensation member depends on the retardation of a liquid-crystal layer or wavelength dispersion of each optical member.

This embodiment uses the configuration shown in FIG. 2 in order to realize polarized state conversion by a simple configuration. However, a configuration in which an optical phase compensation member is provided between a polarization-plate support base material and a substrate can realize a polarized state change same as that described for this embodiment.

Embodiment 11

Figure 45:
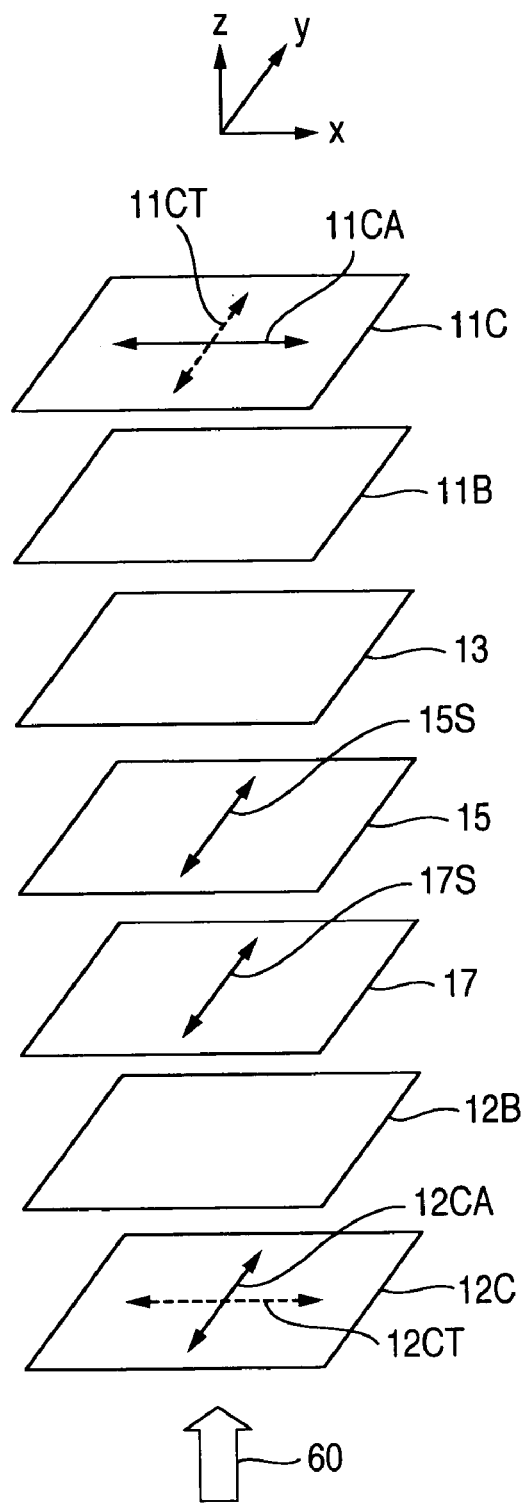
FIG. 45 is a block diagram showing an embodiment of the present invention.

The structure of this embodiment is shown at the left of FIG. 1 and the optical configuration of o-mode is shown in FIG. 45. In the case of this embodiment, the optical phase compensation member 17 set between the substrate 16 and the liquid-crystal layer 15 has double refraction property same as the case of the positive a-plate and 550 nm is obtained by adding retardations of the liquid-crystal layer 15 and optical phase compensation member 17. Moreover, the lag axis 15S of the liquid-crystal layer 15 is parallel with the lag axis 17S of the optical phase compensation member 17. This configuration makes it possible to realize an IPS-mode liquid-crystal display apparatus having a small in-plane display irregularity, high contrast ratio, and preferable visual-angle characteristic.

Figure 46A:
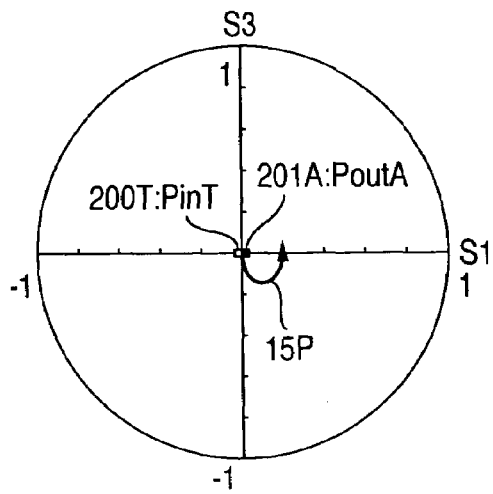
FIGS. 46A and 46B are illustrations respectively showing Poincare sphere display for explaining an embodiment of the present invention.
Figure 46B:
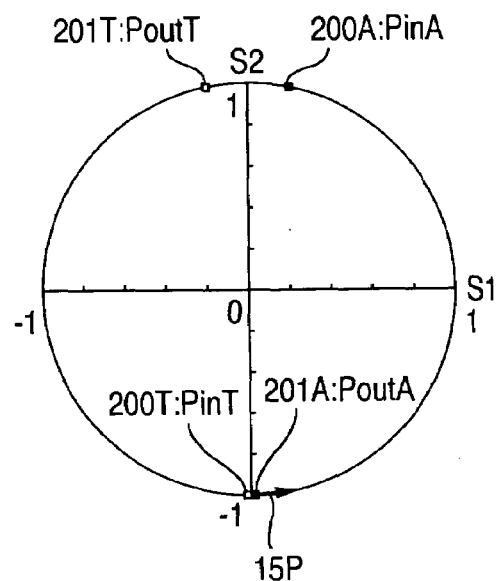

This embodiment is described below. In the case of an IPS-mode liquid-crystal display apparatus, the retardation of a liquid-crystal layer normally ranges between 270 and 400 nm in order to obtain sufficiently bright white display. When the absorption axes of first and second polarizers are completely parallel with or vertical to the optical axis of a liquid-crystal layer, in-plane display irregularity is small and a sufficient contrast ratio is obtained. However, it is difficult to avoid a minute axis shift from occurring in production. A case is considered in which the retardation of a liquid-crystal layer is kept in the above range and an axis shift occurs in the optical axis of the liquid-crystal layer. FIGS. 46A and 46B show cases of viewing black display from the front on the Poincare sphere. When viewing black display from the front and a first polarizer is orthogonal to a second polarizer, a polarized state 200T coincides with a polarized state 201A. However, when an axis shift occurs in the optical axis of the liquid-crystal layer, the polarized state change 15P occurs due to the liquid-crystal layer and light leak occurs. This becomes an in-plane display irregularity or contrast-ratio reduction factor.

Figure 47A:
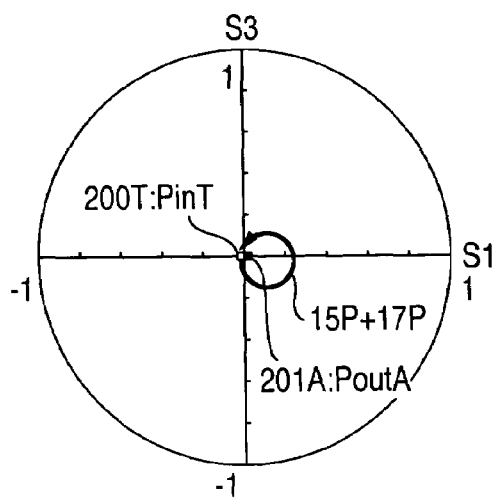
FIGS. 47A and 47B are illustrations respectively showing Poincare sphere display for explaining an embodiment of the present invention.
Figure 47B:
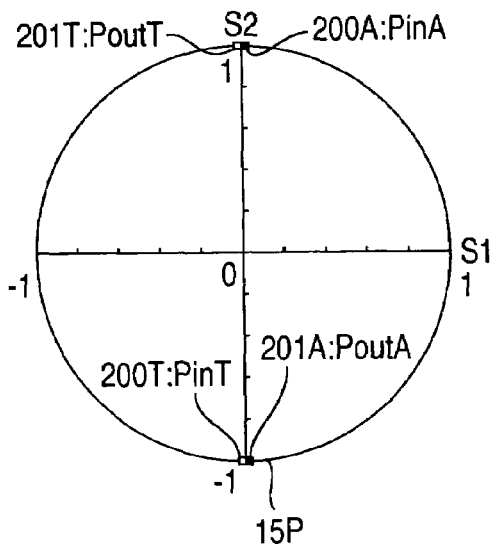

In the case of this embodiment, 550 nm is obtained by adding retardations of the liquid-crystal layer 15 and optical phase compensation member 17 as shown in FIG. 45. FIGS. 47A and 47B show cases of viewing black display from the front on the Poincare sphere. From FIGS. 47A and 47B, it can be understood that preferable black display is obtained also when an axis shift for the polarization-plate absorption axes 12CA and 11CA occurs in the optical axis 15S of the liquid-crystal layer and the lag axis 17S of the optical phase compensation member 17. At the time of white display, double refraction property is changed only in the liquid-crystal layer 15. Therefore, this configuration does not influence the time of white display.

According to our study, advantages of the present invention are obtained when a result of adding retardations of the liquid-crystal layer 15 and optical phase compensation member 17 ranges between 450 and 600 nm. Moreover, in the case of this embodiment, the optical phase compensation member 17 is provided between the first substrate 16 and the liquid-crystal layer 15. As being understood by considering FIGS. 47A and 47B, it is also allowed that the optical phase compensation member 17 is provided between the liquid-crystal-layer-side support base material 12B of the first polarizer and the first substrate 16. That is, it is enough that the optical configuration in FIG. 45 is satisfied. Moreover, it is allowed that the optical phase compensation member 17 is provided between the liquid-crystal layer 15 and the liquid-crystal-layer-side support base material 11B of the second polarizer.

In the case of e-mode, relative relation to the liquid-crystal-layer optical axis 15S and the polarization-plate absorption axis of the lag axis 17S is reverse to the case of this embodiment.

Moreover, according to our study, advantages same as the case of the present invention are obtained even if the optical phase compensation member 17 has double refraction property same as the case of the negative a-plate.

As shown in FIG. 1, this embodiment uses the optical phase compensation member 13. Effects of reduction of in-plane irregularity and improvement of a contrast ratio are obtained by satisfying the above-described conditions without setting the optical phase compensation member 13. The viewing angle characteristic is further improved by setting the optical phase compensation member 13 or controlling double refraction properties of the polarization-plate support base materials 12B and 11B, and combining configurations of the embodiments 1 to 10.

Embodiment 12

The structure of this embodiment is shown at the left of FIG. 1 and the optical configuration of o-mode is shown in FIG. 45. In the case of this embodiment, the optical phase compensation member 17 set between the first substrate 16 and the liquid-crystal layer 15 has double refraction property same as the case of the positive a-plate and 550 nm is obtained by adding retardations of the liquid-crystal layer 15 and optical phase compensation member 17. Moreover, the lag axis 15S of the liquid-crystal layer 15 is parallel with the lag axis 17S of the optical phase compensation member 17. Furthermore, these two axes are tilted in the normal line direction from the first substrate 16 and have the so-called a tilt angle. According to this configuration, it is possible to realize an IPS-mode liquid-crystal display apparatus which has a small in-plane display irregularity, high contrast ratio, and preferable visual-angle characteristic. In the case of this embodiment, it is assumed for simplification that the liquid-crystal-layer-side support base materials 12B and 11B of the polarizer are optically isotropic. Moreover, the optical phase compensation member 13 uses a optically biaxial optical phase compensation film having Nz of 0.5 and retardation of 270 nm.

Figure 48A:
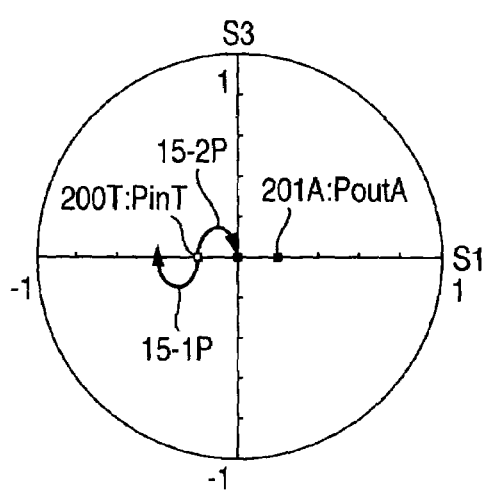
FIGS. 48A and 48B are illustrations respectively showing Poincare sphere display for explaining an embodiment of the present invention.
Figure 48B:
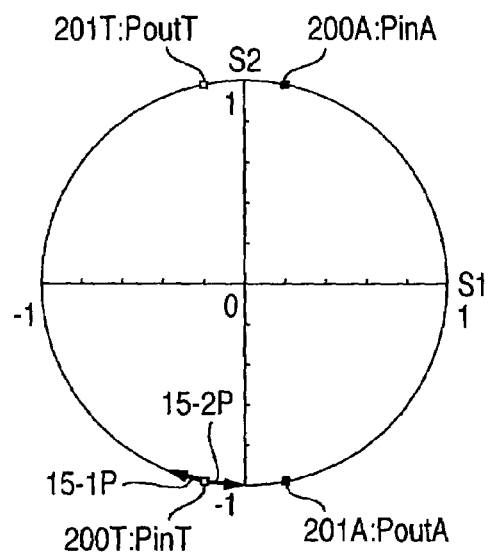

This embodiment is described below. When constituting an IPS-mode liquid-crystal display apparatus, it is necessary that a liquid-crystal layer is homogeneous orientation. Therefore, the rubbing technique is used. In this case, it is general that a liquid-crystal molecule slightly tilts from a substrate and a pretilt angle occurs. According to our study, the liquid-crystal-layer pretilt angle impairs the visual-angle characteristic of the IPS-mode liquid-crystal display apparatus. This is described by referring to FIGS. 48A and 48B in accordance with the Poincare sphere. Because o-mode is provided and the liquid-crystal-layer-side support base material 12B of the first polarizer is optically isotropic, the influence of the liquid-crystal layer at a diagonal viewing angle is restrained as described above. However, when the liquid-crystal layer has a pretilt angle, the influence of the liquid-crystal layer strictly remains at a diagonal viewing angle. Moreover, the influence is asymmetric in the tilt-up direction and tilt-down direction of a liquid-crystal molecule. Two polarized state changes 15-1P and 15-2P shown in FIGS. 48A and 48B are polarized state changes by the liquid-crystal layer 15 and show that the polarized state changes are different in two directions. This asymmetry becomes more remarkable as the pretilt angle of the liquid-crystal layer increases. Therefore, even if incoming light passes through the liquid-crystal layer 15 and then, the polarized state changes shown in FIGS. 13A and 13B are made by the optical phase compensation member 13 or polarization-plate support base material 11B, the asymmetry shown here remains and influences the viewing angle characteristic of the IPS-mode liquid-crystal display apparatus. Particularly, light leak and coloring occur at a diagonal viewing angle at the time of black display.

Figure 49A:
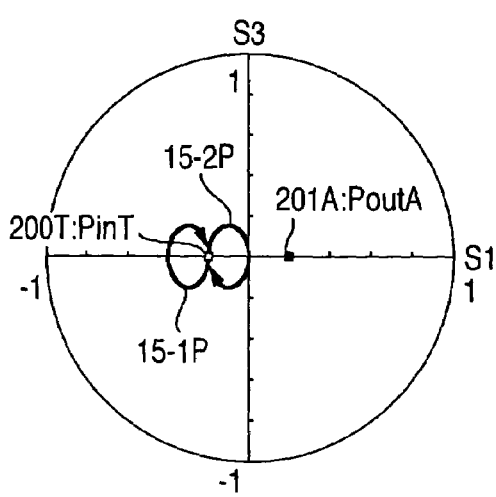
FIGS. 49A and 49B are illustrations respectively showing Poincare sphere display for explaining an embodiment of the present invention.
Figure 49B:
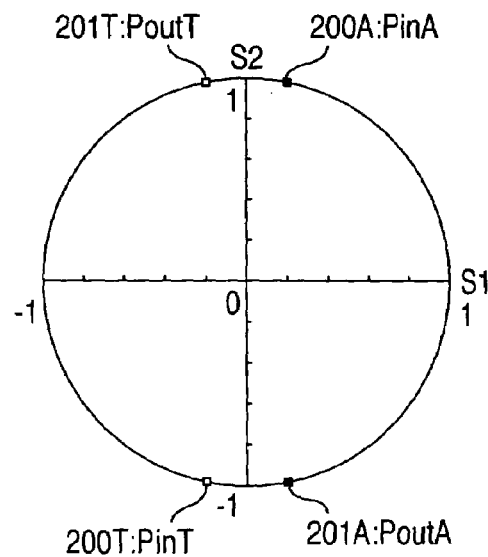

According to the above configuration, it is possible to decrease the influence of the liquid-crystal-layer pretilt. This is described by referring to FIGS. 49A and 49B. In the case of the IPS-mode liquid-crystal display apparatus having the above configuration, FIGS. 49A and 49B show polarized state changes at diagonal viewing angles at the timed of black display only by the optical phase compensation member 17 and liquid-crystal layer 15. In the case of this embodiment, the optical phase compensation member 17 has a pretilt angle same as the case of the liquid crystal layer 15 and retardation sum of both are approximately 550 nm. Therefore, as shown in FIGS. 49A and 49B, polarized states after incoming light passes through the optical phase compensation member 17 and liquid-crystal layer 15 almost coincide with each other.

Figure 50:
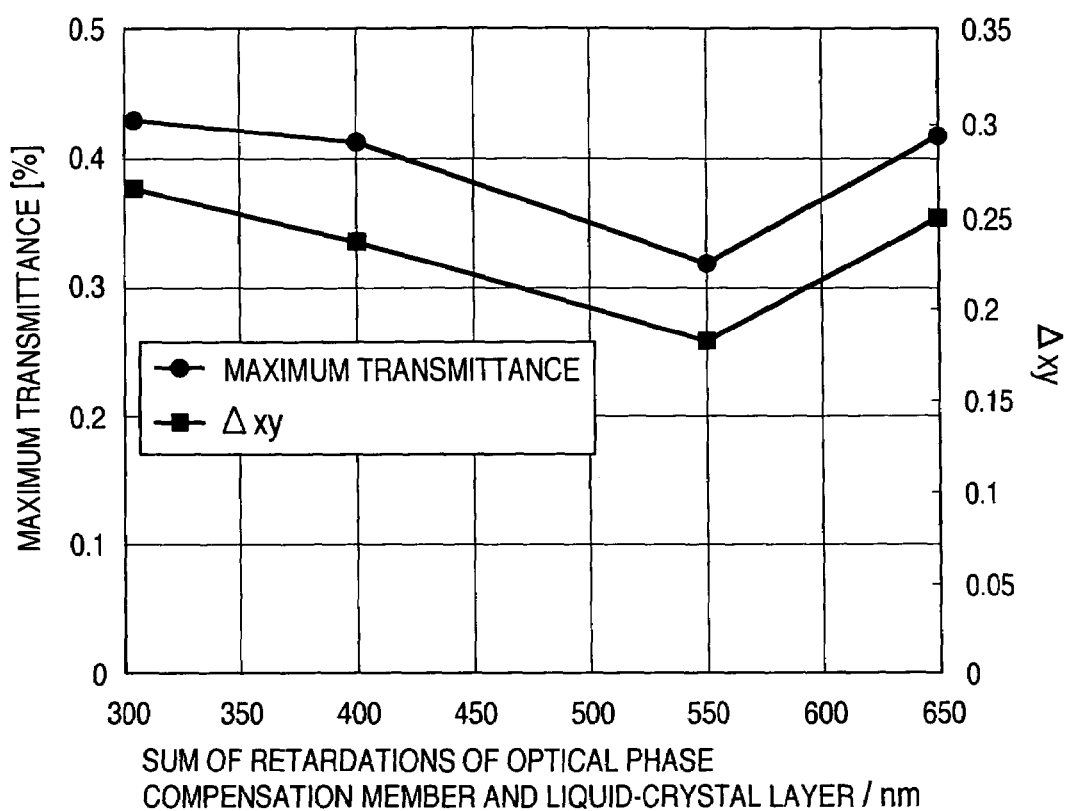
FIG. 50 is a characteristic diagram of an embodiment of a liquid-crystal display apparatus of the present invention.

In this configuration, FIG. 50 shows changes of the maximum transmittance and Δxy when changing the sum of retardations of the optical phase compensation member 17 and liquid-crystal layer 15. It can be understood that as the sum of both retardations approaches 550 nm, the viewing angle characteristic is improved. In the case of this embodiment, in-plane irregularity is reduced and contrast ratio improvement effect is obtained because of satisfying the conditions of the embodiment 11.

Moreover, this embodiment uses a optically biaxial optical phase compensation film having $N_2$ Of 0.5 and retardation of 270 nm as the optical phase compensation member 13. When polarized state changes after incoming light passes through the liquid-crystal layer 15 and optical phase compensation member 17 are realized as shown in FIGS. 13A and 13B by the optical phase compensation member 13 and polarization-plate support base material 11B, a preferable viewing angle characteristic is obtained (in the case of o-mode). Moreover, according to our study, when the sum of retardations of the liquid-crystal layer 15 and optical phase compensation member 17 ranges between 450 and 600 nm, advantages of the present invention are obtained. Moreover, in the case of this embodiment, the optical phase compensation member 17 is provided between the first substrate 16 and the liquid-crystal layer 15. However, as being understood by considering FIG. 47, it is also allowed that the optical phase compensation member 17 is provided between the liquid-crystal-layer-side support base material 12B of the first polarizer and the first substrate 16. That is, it is enough that the optical configuration in FIG. 45 is satisfied. Moreover, it is allowed that the optical phase compensation member 17 is provided between the liquid-crystal layer 15 and the liquid-crystal-layer-side support base material 11B of the second polarizer.

In the case of e-mode, the relative relation to the liquid-crystal-layer optical axis 15S and polarization-plate absorption axis of the lag axis 17S is reverse to the case of this embodiment.

Moreover, according to our study, even if the optical phase compensation member 17 has double refraction property same as the case of the negative a-plate, advantages same as those of the present invention are obtained. In this case, however, it is necessary to substantially equalize the retardation of the liquid-crystal layer 15 with the retardation of the optical phase compensation member 17 and it is necessary that the optical axis 15S of the liquid-crystal layer 15 is orthogonal to the lag axis 17S of the optical phase compensation member 17.

The present invention relates to a liquid-crystal display, particularly to an in-plane-switching-mode (IPS) liquid-crystal display apparatus for controlling transmission and cutoff of light by applying a horizontal electric field to liquid-crystal molecules oriented in the horizontal direction and great improvement of its viewing angle characteristic (black display and low gradation), which can be applied to every IPS-mode liquid-crystal display.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A liquid-crystal display apparatus comprising:
a liquid-crystal layer in which absorption axes of a first substrate having a light-incoming-side polarizer and a second substrate having a second polarizer (smaller angle ranges between 88 and 90°) liquid-crystal molecules are oriented in parallel with the substrates and almost vertical to or in almost parallel with the absorption axis of the first polarizer (smaller angle ranges between 0 and 2°), and the liquid-crystal molecules rotate in a plane parallel with the first substrate by applying an electric field in a direction parallel with the first substrate; and
a back lighting system in which a matrix-driven electrode group including a pair of electrodes is provided at rear side of liquid-crystal layer by facing each pixel to the side of either of the first substrate or the second substrate whichever is closer to the liquid crystal layer, wherein
the absorption axis of the first polarizer and the optical axis of the liquid-crystal layer are almost vertical (smaller angle ranges between 88 and 90°), a support base material of the second polarizer at the liquid-crystal layer side has double refraction property (retardations in plane and thickness direction are 10 nm or more), the support base material of the second polarizer at the liquid-crystal layer side contacts with an optical member of film having double refraction property, and when laminating the support base material of the second polarizer at the liquid-crystal layer side and the optical member or film having the double refraction property, refraction factor is almost isotropic (retardations in plane and thickness direction are 10 nm or less).

2. The liquid-crystal display apparatus according to claim 1, wherein
one or more optical phase compensation members which have double refraction property and compensate a polarized state of transmitted polarized light are included between the liquid-crystal layer and the first polarizer.

3. The liquid-crystal display apparatus according to claim 2, wherein
an optical phase compensation member set between the liquid-crystal layer and the polarizer has an in-plane lag-axis-directional refraction factor n1, an in-plane phase-advance-axis-directional refraction factor n2, and a thickness-directional refraction factor n3 and satisfies relations of $0.3<(n1-n3)/(n1-n2)<0.7$ and $150 \text{ nm} \leq \{n3-(n1+n2)/2\}dr \leq 400 \text{ nm}$ for a thickness dr, and the in-plane lag axis of the optical phase compensation member is almost vertical to the in-plane lag axis of the liquid-crystal layer (smaller angle ranges between 88 and 90°) or almost parallel with the lag axis (smaller angle ranges between 0 and 2°).

4. The liquid-crystal display apparatus according to claim 2, wherein
a first optical phase compensation member is provided to the first polarizer and a second optical phase compensation member is provided to the liquid-crystal layer side as optical phase compensation members between the liquid-crystal layer and the first polarizer, the first optical phase compensation member has an in-plane lag-phase-directional refraction factor n1, an in-plane phase-advance-axis-directional refraction factor n2, and an in-plane thickness-directional refraction factor n3 and satisfies relations of $(n1-n3)/(n1-n2)>0.5$ and $20 \text{ nm} \leq \{n3-(n1+n2)/2\}dr \leq 180 \text{ nm}$ for a thickness dr, the second optical phase compensation member has an in-plane lag-axis-directional refraction factor n1, an in-plane phase-advance-axis-directional refraction factor n2, and a thickness-directional refraction factor n3 and satisfies relations of $(n1-n3)/(n1-n2)<0.5$ and $20 \text{ nm} \leq \{n3-(n1+n2)/2\}dr \leq 180 \text{ nm}$ for a thickness dr, and in-plane lag axes of the first and second optical phase compensation members are almost parallel with the in-plane lag axis of the liquid-crystal layer (smaller angle ranges between 0 and 2°).

5. The liquid-crystal display apparatus according to claim 2, wherein a first optical phase compensation member is provided to the first polarizer side, a second optical phase compensation member is provided to the liquid-crystal layer side as optical phase compensation members set between the liquid-crystal layer and the first polarizer, the first optical phase compensation member has an in-plane lag-axis-directional refraction factor n1, an in-plane phase-advance-axis-directional refraction factor n2, and a thickness-directional refraction factor n3 and satisfies relations of $(n1-n3)/(n1-n2)<0.5$ and $20 \text{ nm} \leq \{n3-(n1+n2)/2\}dr \leq 180 \text{ nm}$ for a thickness dr, the second optical phase compensation member has an in-plane lag-axis-directional refraction factor n1, an in-plane phase-advance-axis-directional refraction factor n2, and thickness-directional refraction factor n3 and satisfies relations of $(n1-n3)/(n1-n2)>0.5$ and $20 \text{ nm} \leq \{n3-(n1+n2)/2\}dr \leq 180 \text{ nm}$ for a thickness dr, and in-plane lag-axes of the first and second optical phase compensation members are almost vertical to the in-plane lag axis of the liquid-crystal layer (smaller angle ranges between 0 and 2°).

6. The liquid-crystal display apparatus according to claim 2, wherein
a first optical phase compensation member is provided to the first polarizer and a second optical phase compensation member is provided to the liquid-crystal layer as optical phase compensation members set between the liquid-crystal layer and the first polarizer, the first optical phase compensation member has an in-plane lag-axis-directional refraction factor n1, an in-plane phase-advance-axis-directional refraction factor n2, and a thickness-directional refraction factor n3 and satisfies relations of $0.15<(n1-n3)/(n1-n2)<0.35$ and $200 \text{ nm} \leq \{n3-(n1+n2)/2\}dr \leq 350 \text{ nm}$ for a thickness dr, the second optical phase compensation member has an in-plane lag-axis-directional refraction factor n1, an in-plane phase-advance-axis-directional refraction factor n2, and thickness directional refraction factor n3 and satisfies relations of $0.65<(n1-n3)/(n1-n2)<0.85$ and $200 \text{ nm} \leq \{n3-(n1+n2)/2\}dr \leq 350 \text{ nm}$ for a thickness dr, and in-plane lag axes of the first and second optical phase compensation members are almost parallel with the in-plane phase advance axis of the liquid-crystal layer (smaller angle ranges between 0 and 2°).

7. The liquid-crystal display apparatus according to claim 2, wherein
a first optical phase compensation member is provided to the first polarizer and a second optical phase compensation member is provided to the liquid-crystal layer as optical phase compensation members set between the liquid-crystal layer and the first polarizer, the first optical phase compensation member has an in-plane lag-axis-directional refraction factor n1, an in-plane phase-advance-axis-directional refraction factor n2, and a thickness-directional refraction factor n3 and satisfies relations of $0.65<(n1-n3)/(n1-n2)<0.85$ and $200 \text{ nm} \leq \{n3-(n1+n2)/2\}dr \leq 350 \text{ nm}$ for a thickness dr, the second optical phase compensation member has an in-plane lag-axis-directional refraction factor n1, an in-plane phase-advance-axis-directional refraction factor n2, and thickness directional refraction factor n3 and satisfies relations of $0.15<(n1-n3)/(n1-n2)<0.35$ and $200 \text{ nm} \leq \{n3-(n1+n2)/2\}dr \leq 350 \text{ nm}$ for a thickness dr, and in-plane lag axes of the first and second optical phase compensation members are almost vertical to the in-plane lag axis of the liquid-crystal layer (smaller angle ranges between 88 and 90°).

8. A liquid-crystal display apparatus comprising:
a liquid-crystal layer in which absorption axes of a first substrate having a light-incoming-side polarizer and a second substrate having a second polarizer (smaller angle ranges between 88 and 90°) liquid-crystal molecules are oriented in parallel with the substrates and almost vertical to or in almost parallel with the absorption axis of the first polarizer (smaller angle ranges between 0 and 2°), and the liquid-crystal molecules rotate in a plane parallel with the first substrate by applying an electric field in a direction parallel with the first substrate; and
a back lighting system in which a matrix-driven electrode group including a pair of electrodes is provided by facing each pixel to the side of either of the first substrate or the second substrate whichever is closer to the liquid crystal layer, wherein
the first and second polarizers are respectively a polarizer having a support base material at both sides of a polarization layer, the support base material has double refraction property (retardations in plane and thickness direction are 10 nm or more), a support base material provided to the liquid-crystal layer sides of the first and second polarizers respectively show almost-equal double refraction property (retardation difference in plane or thickness direction is 20 nm or less), and an optical phase compensation member having double refraction property (retardation in plane or thickness direction is 20 nm or more) is provided between the first substrate and the liquid-crystal layer.

9. A liquid-crystal display apparatus comprising:
a liquid-crystal layer in which absorption axes of a first substrate having a light-incoming-side polarizer and a second substrate having a second polarizer (smaller angle ranges between 88 and 90°) liquid-crystal molecules are oriented in parallel with the substrates and almost vertical to or in almost parallel with the absorption axis of the first polarizer (smaller angle ranges between 0 and 2°), and the liquid-crystal molecules rotate in a plane parallel with the first substrate by applying an electric field in a direction parallel with the first substrate; and
a back lighting system in which a matrix-driven electrode group including a pair of electrodes is provided by facing each pixel to the side of either of the first substrate or the second substrate whichever is closer to the liquid crystal layer, wherein
the first and second polarizers are respectively a polarizer having a support base material at both sides of a polarization layer, the support base material has double refraction property (retardations in plane and thickness direction are 10 nm or more), a support base material provided to the liquid-crystal layer sides of the first and second polarizers respectively show almost-equal double refraction property (retardation difference in plane or thickness direction is 20 nm or less), and an optical phase compensation member having double refraction property (retardation in plane or thickness direction is 20 nm or more) is provided between the liquid-crystal layer and the second substrate.

10. The liquid-crystal display apparatus according to claim 9, wherein
support base materials of the first and second polarizers set to the liquid-crystal layer side satisfy a relation of $n1 \leq n3 > n2$ for an in-plane lag-axis-directional refraction factor n1, an in-plane phase-advance-axis-directional refraction factor n2, and a thickness-directional refraction factor n3, an optical phase compensation member set between the liquid-crystal layer and the second substrate satisfies a relation of $n1 > n2 \leq n3$ and support base materials of the first and second polarizers set to the liquid-crystal layer side and the in-plate lag axis of an optical phase compensation member set between the liquid-crystal layer and the second substrate are almost parallel with the absorption axis of the first polarizer (smaller angle ranges between 0 and 2°) or almost vertical to the absorption axis (smaller angle ranges between 88 and 90°).

11. The liquid-crystal display apparatus according to claim 9, wherein
support base materials of the first and second polarizers set to the liquid-crystal layer side satisfy a relation of $n1 \leq n3 > n2$ for an in-plane lag-axis-directional refraction factor n1, an in-plane phase-advance-axis-directional refraction factor n2, and a thickness-directional refraction factor n3, an optical phase compensation member set between the liquid-crystal layer and the second substrate satisfies a relation of $n1 \leq n3 > n2$ and support base materials of the first and second polarizers set to the liquid-crystal layer side and the in-plate lag axis of an optical phase compensation member set between the liquid-crystal layer and the second substrate are almost parallel with the absorption axis of the first polarizer (smaller angle ranges between 0 and 2°) or almost vertical to the absorption axis (smaller angle ranges between 88 and 90°).

12. The liquid-crystal display apparatus according to claim 8, wherein
support base materials of the first and second polarizers set to the liquid-crystal layer side satisfy a relation of $n1 \leq n3 > n2$ for an in-plane lag-axis-directional refraction factor n1, an in-plane phase-advance-axis-directional refraction factor n2, and a thickness-directional refraction factor n3, an optical phase compensation member set between the first substrate and the liquid-crystal layer satisfies a relation of $n1 > n2 \leq n3$ and the support base materials of the first and second polarizers set to the liquid-crystal layer side and the in-plate lag axis of an optical phase compensation member set between the first substrate and the liquid-crystal layer are almost parallel with the absorption axis of the first polarizer (smaller angle ranges between 0 and 2°) or almost vertical to the absorption axis (smaller angle ranges between 88 and 90°).

13. The liquid-crystal display apparatus according to claim 8, wherein
support base materials of the first and second polarizers set to the liquid-crystal layer side satisfy a relation of $n1 \leq n3 > n2$ for an in-plane lag-axis-directional refraction factor n1, an in-plane phase-advance-axis-directional refraction factor n2, and a thickness-directional refraction factor n3, an optical phase compensation member set between the first substrate and the liquid-crystal layer satisfies a relation of $n1 > n2 \leq n3$ and support base materials of the first and second polarizers set to the liquid-crystal layer side and the in-plate lag axis of an optical phase compensation member set between the first substrate and the liquid-crystal layer are almost parallel with the absorption axis of the first polarizer (smaller angle ranges between 0 and 2°) or almost vertical to the absorption axis (smaller angle ranges between 88 and 90°).

14. A liquid-crystal display apparatus comprising:
a liquid-crystal layer in which absorption axes of a first substrate having a light-incoming-side polarizer and a second substrate having a second polarizer (smaller angle ranges between 88 and 90°) liquid-crystal molecules are oriented in parallel with the substrates and almost vertical to or in almost parallel with the absorption axis of the first polarizer (smaller angle ranges between 0 and 2°), and the liquid-crystal molecules rotate in a plane parallel with the first substrate by applying an electric field in a direction parallel with the first substrate; and
a back lighting system in which a matrix-driven electrode group including a pair of electrodes is provided by facing each pixel to the side of either of the first substrate or the second substrate whichever is closer to the liquid crystal layer, wherein
an optical phase compensation member having double refraction property is provided between the first and second substrates in addition to the liquid-crystal layer, the optical axis of the liquid-crystal layer is almost parallel with the lag axis of the optical phase compensation member, the optical phase compensation member satisfies $n1 > n2 \leq n3$ for an in-plane lag-axis-directional refraction factor n1, an in-plane phase-advance-axis-directional refraction factor n2, and a thickness-directional refraction factor n3, and the sum of in-plane retardations of the liquid-crystal layer and the optical phase compensation member ranges between 450 and 600 nm (both included).

15. The liquid-crystal display apparatus according to claim 14, wherein
tilt angles of the optical axis of the liquid-crystal layer and the lag axis of the optical phase compensation member to the first substrate are almost equal to each other (angle difference is kept within ±1°).

* * * * *